(12) United States Patent
Yoo et al.

(10) Patent No.: US 11,983,359 B2
(45) Date of Patent: May 14, 2024

(54) DISPLAY DEVICE

(71) Applicant: LG Display Co., Ltd., Seoul (KR)

(72) Inventors: TaeYeon Yoo, Goyang-si (KR);
Sanghoon Jeong, Iksan-si (KR);
Seonghwan Woo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/957,807

(22) Filed: Sep. 30, 2022

(65) Prior Publication Data

US 2023/0205357 A1 Jun. 29, 2023

(30) Foreign Application Priority Data

Dec. 24, 2021 (KR) ........................ 10-2021-0186967

(51) Int. Cl.
*G06F 3/041* (2006.01)
*G06F 3/044* (2006.01)

(52) U.S. Cl.
CPC ............... *G06F 3/04164* (2019.05); *G06F 2203/04107* (2013.01)

(58) Field of Classification Search
None
See application file for complete search history.

(56) References Cited

U.S. PATENT DOCUMENTS

| 2011/0316803 | A1* | 12/2011 | Kim ........................ G06F 3/044 345/173 |
| 2013/0314625 | A1* | 11/2013 | Tsai .................... G02F 1/13338 349/12 |
| 2018/0032189 | A1* | 2/2018 | Lee ......................... H10K 59/12 |
| 2019/0237533 | A1* | 8/2019 | Kim ................... H10K 50/8426 |
| 2022/0050555 | A1* | 2/2022 | Maruyama ........... G06F 3/04164 |

FOREIGN PATENT DOCUMENTS

KR 10-2015-0060449 A 6/2015

\* cited by examiner

*Primary Examiner* — Krishna P Neupane
(74) *Attorney, Agent, or Firm* — Birch, Stewart, Kolasch & Birch, LLP

(57) ABSTRACT

A display device can include a substrate including a display area and a non-display area. The display device can further include a plurality of light-emitting elements disposed on the substrate, and a sealing layer disposed on the plurality of light-emitting elements. The display device also can include a touch detection part disposed on the sealing layer in the display area, and a plurality of touch routing lines connected to the touch detection part in the non-display area. Further, the display device can include a shield part disposed to surround two opposite sides and a lower side of one or more touch routing lines among the plurality of touch routing lines.

18 Claims, 12 Drawing Sheets

DISPLAY DEVICE

CROSS-REFERENCE TO RELATED APPLICATIONS

This application claims priority to Korean Patent Application No. 10-2021-0186967 filed on Dec. 24, 2021 in the Republic of Korea, the entire contents of which are hereby expressly incorporated by reference into the present application.

BACKGROUND

Field

The present disclosure relates to a display device, and more particularly, to an integrated touch screen display device capable of improving touch performance.

Description of the Related Art

As the information-oriented society is implemented, there is an increasing demand for various display devices for displaying images.

Recently, various display devices such as a liquid crystal display (LCD) device, an organic light-emitting display (OLED) device, a quantum-dot light-emitting display (QLED) device, and an inorganic light-emitting display device have been used.

Among the display devices, the quantum-dot light-emitting display device, the inorganic light-emitting display device, and the organic light-emitting display device are self-luminance display devices that are excellent in response speed, viewing angle, color reproducibility, and the like and can be implemented as thin display device. Therefore, more recently, the quantum-dot light-emitting display device, the inorganic light-emitting display device, and the organic light-emitting display device have been receiving much attention.

In addition, the display device can operate in response to a user's command input through various input devices such as a keyboard and a mouse.

In this regard, a touch screen display device is used as the input device. The touch screen display device enables the user to intuitively and conveniently input the command by touching a touch screen of the display device. The touch screen is disposed on the screen of the display device. When the user touches a particular point on the screen of the display device, the display device can receive the user's command. Since the touch screen detects a touch coordinate, the touch screen can be referred to as a touch detection part.

SUMMARY OF THE DISCLOSURE

An object to be achieved by the present disclosure is to provide an integrated touch screen display device including a shield part capable of minimizing touch noise.

Another object to be achieved by the present disclosure is to provide an integrated touch screen display device capable of suppressing deterioration in touch performance so that accurate touch sensing is enabled.

Still another object to be achieved by the present disclosure is to provide an integrated touch screen display device capable of ensuring a design margin of a cathode electrode by separately disposing a shield part capable of blocking driving signal noise.

Objects of the present disclosure are not limited to the above-mentioned objects, and other objects, which are not mentioned above, can be clearly understood by those skilled in the art from the following descriptions.

According to an aspect of the present disclosure, there is provided a display device. The display device includes a substrate including a display area and a non-display area. The display device further includes a plurality of light-emitting elements disposed on the substrate. The display device further includes a sealing layer disposed on the plurality of light-emitting elements. The display device further includes a touch detection part disposed on the sealing layer in the display area. The display device further includes a plurality of touch routing lines connected to the touch detection part in the non-display area. The display device further includes a shield part disposed to surround two opposite sides and a lower side of one or more touch routing lines among the plurality of touch routing lines.

Other detailed matters of the exemplary embodiments are included in the detailed description and the drawings.

According to the present disclosure, it is possible to minimize interference occurring between the driving signal and the touch signal on the display panel when the cathode electrode does not overlap all the touch routing lines.

According to the present disclosure, it is possible to reduce touch noise and enable stable touch sensing despite the design margin of the cathode electrode.

According to the present disclosure, it is possible to improve touch precision by reducing noise that can reach the touch detection part.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
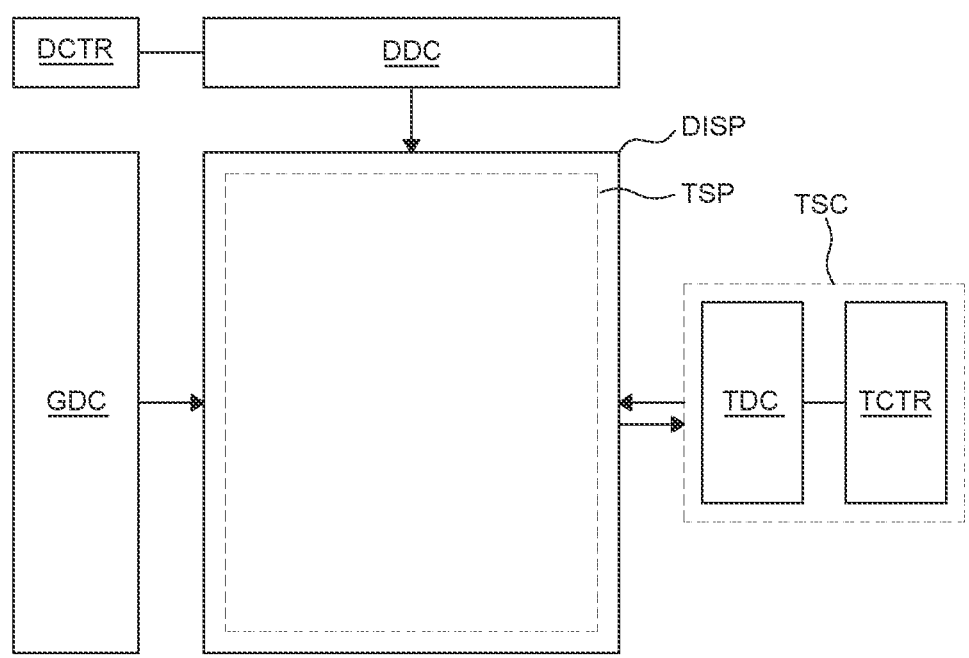
FIG. 1 is a view illustrating a schematic configuration of an integrated touch screen display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "comprising" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, it can be directly on the another element or layer, or another layer or another element can be interposed therebetween.

Although the terms "first", "second", and the like are used for describing various components, these components are not confined by these terms. These terms are merely used for distinguishing one component from the other components and may not define order. Therefore, a first component to be mentioned below can be a second component in a technical concept of the present disclosure.

Same reference numerals generally denote same elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings. All the components of each display device according to all embodiments of the present disclosure are operatively coupled and configured.

FIG. 1 is a view illustrating a schematic configuration of an integrated touch screen display device according to an embodiment of the present disclosure. More specifically, FIG. 1 is a systematic configuration view of the integrated touch screen display device according to the embodiments of the present disclosure.

Referring to FIG. 1, an integrated touch screen display device 100 according to the embodiments of the present disclosure can provide both a function of displaying images and a function of sensing touch.

To provide the image display function, the integrated touch screen display device according to the embodiments of the present disclosure can include a display panel DISP on which a plurality of data lines and a plurality of gate lines are disposed and a plurality of subpixels defined by the plurality of data lines and the plurality of gate lines are arranged, a data drive circuit DDC configured to operate the plurality of data lines, a gate drive circuit GDC configured to operate the plurality of gate lines, and a display controller DCTR configured to control an operation of the data drive circuit DDC and an operation of the gate drive circuit GDC.

The data drive circuit DDC, the gate drive circuit GDC, and the display controller DCTR can be implemented as one or more separate components. In some instances, two or more components, among the data drive circuit DDC, the gate drive circuit GDC, and the display controller DCTR, can be integrated into a single component. For example, the data drive circuit DDC and the display controller DCTR can be implemented as a single integrated circuit chip (IC chip).

To provide the touch sensing function, the integrated touch screen display device according to the embodiments of the present disclosure can include a touch panel TSP including a plurality of touch electrodes; and a touch sensing circuit TSC configured to supply a touch driving signal to the touch panel TSP, detect a touch sensing signal from the touch panel TSP, and sense a touch position (touch coordinate) or whether a user's touch is made on the touch panel TSP on the basis of the detected touch sensing signal.

For example, the touch sensing circuit TSC can include a touch drive circuit TDC configured to supply the touch driving signal to the touch panel TSP and detect the touch sensing signal from the touch panel TSP, and a touch controller TCTR configured to sense a touch position and/or whether the user's touch is made on the touch panel TSP on the basis of the touch sensing signal detected by the touch drive circuit TDC.

The touch drive circuit TDC can include a first circuit part configured to supply the touch driving signal to the touch panel TSP, and a second circuit part configured to detect the touch sensing signal from the touch panel TSP.

The touch drive circuit TDC and the touch controller TCTR can be implemented as separate components or integrated into a single component in some instances.

Meanwhile, the data drive circuit DDC, the gate drive circuit GDC, and the touch drive circuit TDC can each be implemented as one or more integrated circuits. The data drive circuit DDC, the gate drive circuit GDC, and the touch drive circuit TDC can be implemented as a chip-on-glass (COG) type, a chip-on-film (COF) type, or a tape carrier package (TCP) type in a standpoint related to the electrical connection with the display panel DISP. The gate drive circuit GDC can also be implemented as a gate-in-panel (GIP) type.

Meanwhile, the circuit components DDC, GDC, and DCTR for the display operation and the circuit components TDC and TCTR for the touch sensing can be implemented as one or more separate components. In some instances, one or more components, among the circuit components DDC, GDC, and DCTR for the display operation, and one or more components, among the circuit components TDC and TCTR for the touch sensing, can be integrated functionally and implemented as one or more components.

For example, the data drive circuit DDC and the touch drive circuit TDC can be integrated into one integrated circuit chip or two or more integrated circuit chips. In the case in which the data drive circuit DDC and the touch drive circuit TDC are integrated into the two or more integrated circuit chips, the two or more integrated circuit chips can each have a data operating function and a touch operating function.

Meanwhile, the integrated touch screen display device according to the embodiments of the present disclosure can be various types of display devices such as an organic light-emitting display device and a liquid crystal display device. Hereinafter, for the convenience of description, an example will be described in which the integrated touch screen display device is the organic light-emitting display device. For example, the display panel DISP can be various types of display panels such as an organic light-emitting display panel and a liquid crystal display panel. However, hereinafter, for the convenience of description, an example will be described in which the display panel DISP is the organic light-emitting display panel.

Meanwhile, as described below, the touch panel TSP can include a plurality of touch electrodes to which the touch driving signal TDS can be applied or from which the touch sensing signal can be detected, and a plurality of touch routing lines configured to connect the plurality of touch electrodes to the touch drive circuit TDC.

The touch panel TSP can be disposed outside the display panel DISP. For example, the touch panel TSP and the display panel DISP can be separately manufactured and then coupled. The touch panel TSP can be called an externally-carried type or an add-on type.

As another example, the touch panel TSP can be embedded in the display panel DISP. For example, at the time of manufacturing the display panel DISP, the touch sensor structure including the plurality of touch electrodes and the plurality of touch routing lines, which constitute the touch panel TSP, can be formed together with the signal lines and electrodes for the display operation. The touch panel TSP can be called an embedded type. For the convenience of description, an example will be described below in which the touch panel TSP is the embedded type.

Figure 2A:
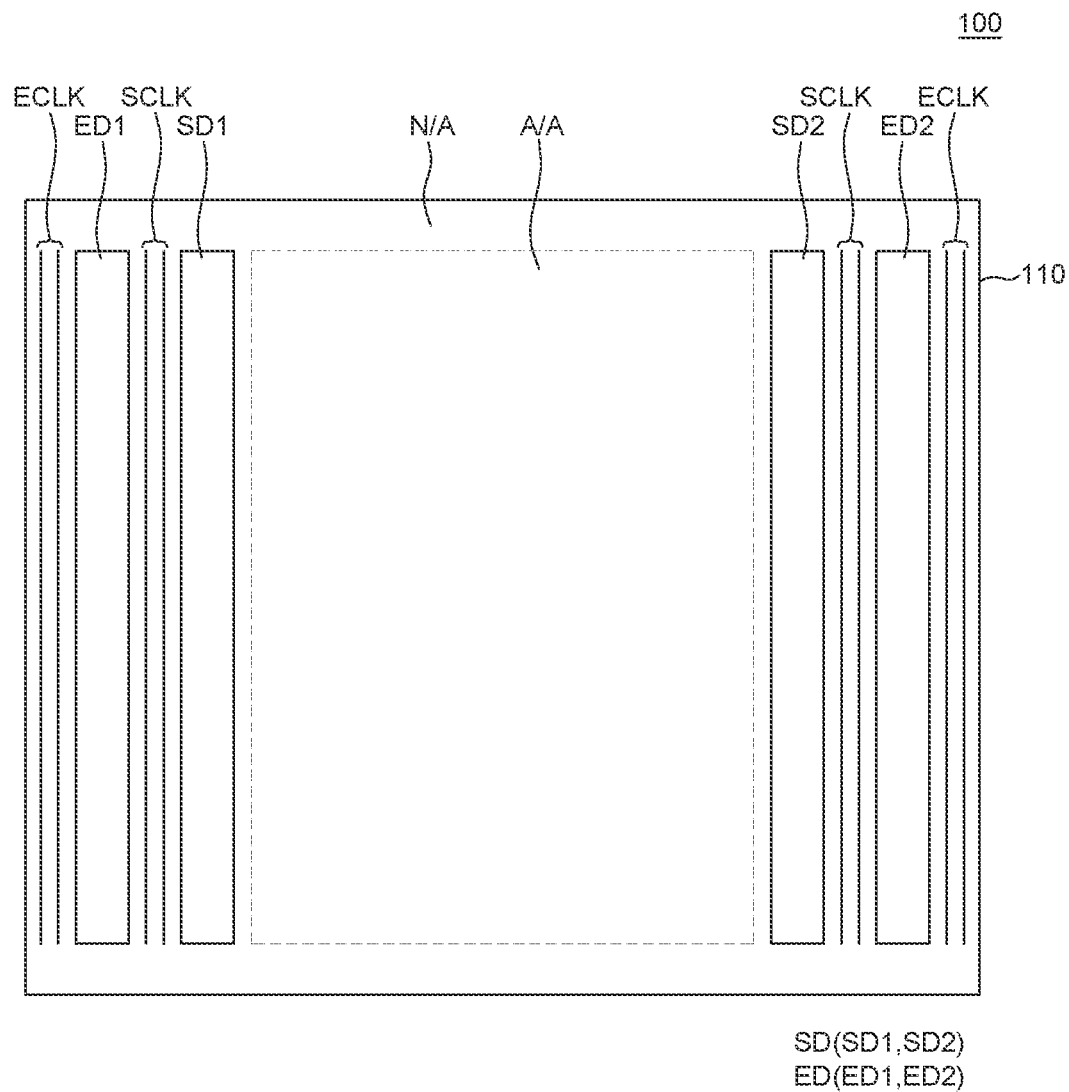
FIGS. 2A to 2C are schematic top plan views of the display device according to the embodiment of the present disclosure.
Figure 2B:
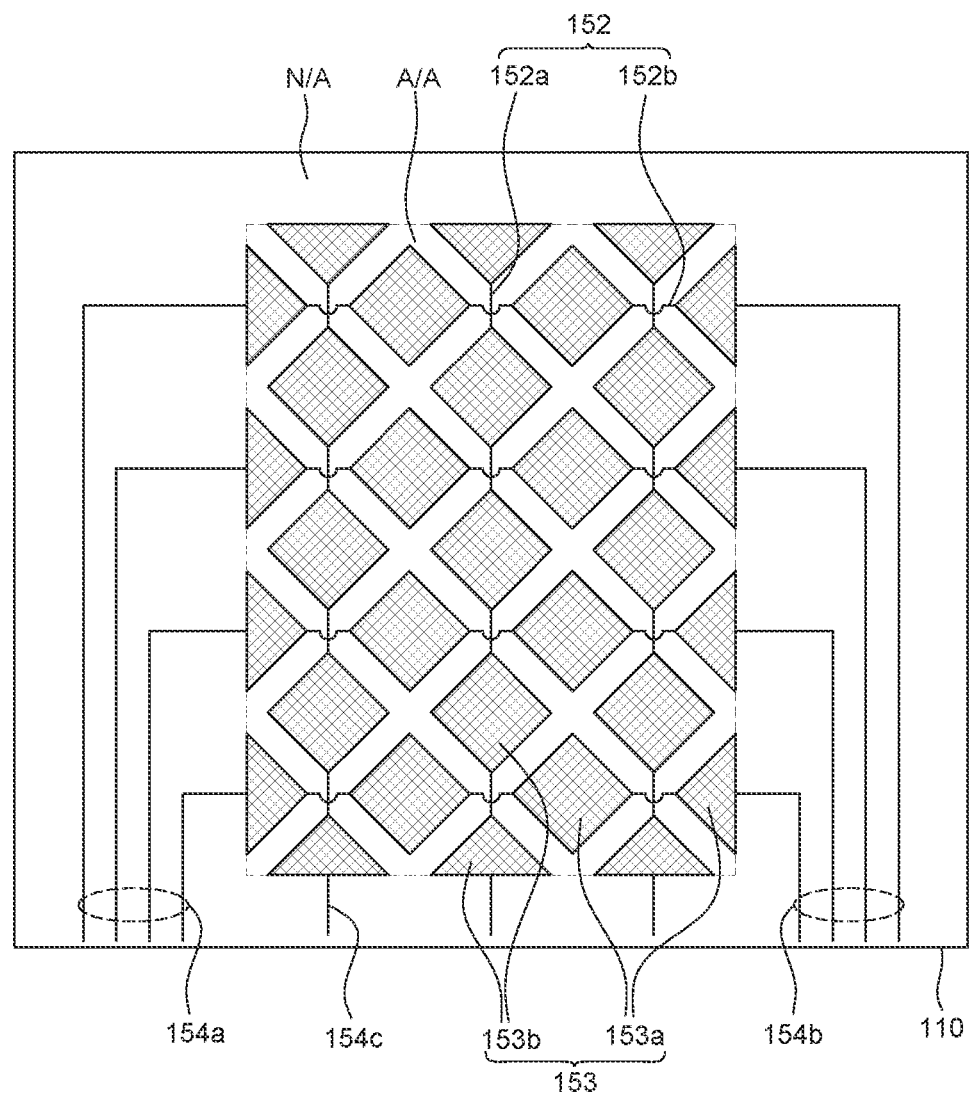
Figure 2C:
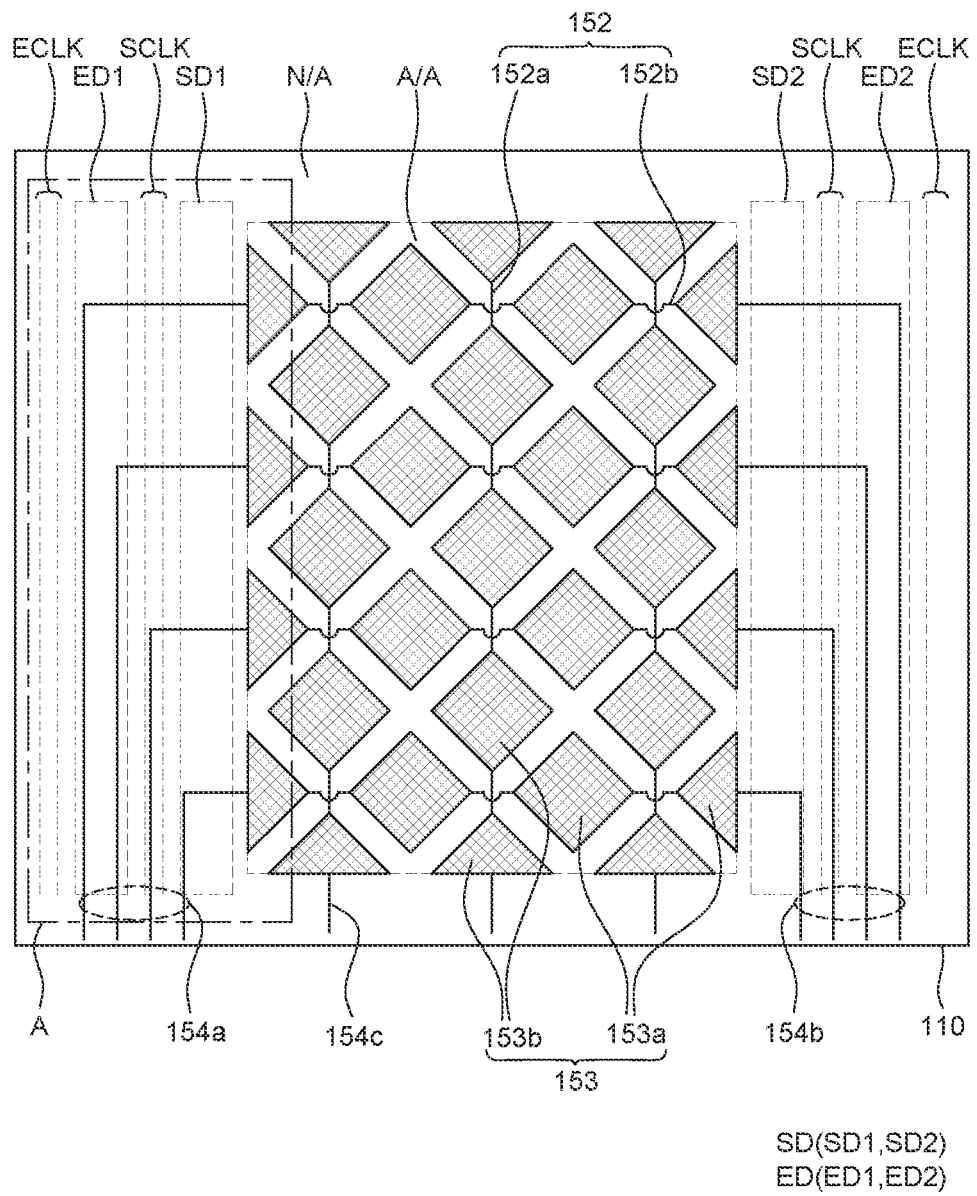

FIGS. 2A to 2C are schematic top plan views of the display device according to the embodiment of the present disclosure.

For the convenience of illustration, FIG. 2A illustrates a substrate 110, a scan driver SD, a light-emitting driver ED, and clock lines SCLK and ECLK among various constituent elements of the display device 100. For the convenience of illustration, FIG. 2B illustrates touch electrodes 153, touch routing lines 154a and 154b, and sensing lines 154c among various components of the display device. FIG. 2C is a top plan view illustrating a combination of FIGS. 2A and 2B and illustrates dotted lines indicating scan drivers SD1 and SD2, light-emitting drivers ED1 and ED2, and the clock lines SCLK and ECLK disposed at side portions. The plurality of scan clock lines SCLK can be disposed closer to an outer periphery than the scan driver SD. The light-emitting driver ED can be disposed closer to the outer periphery than the plurality of scan clock lines SCLK. The light-emitting clock line ECLK can be disposed closer to the outer periphery than the light-emitting driver ED.

Referring to FIG. 2A, the substrate 110 of the display device 100 according to the present disclosure includes a display area A/A and a non-display area N/A.

The substrate 110 is a component for supporting various constituent elements included in the display device 100 and can be made of an insulating material. For example, the substrate 110 can be made of glass, resin, or the like. In addition, the substrate 110 can include plastic such as polymer and can be made of a material having flexibility.

The display area A/A is an area in which a plurality of subpixels is disposed to display the image. Each of the plurality of subpixels is an individual unit configured to emit light, and a light-emitting element and a drive circuit are disposed on each of the plurality of subpixels.

The non-display area N/A is an area in which no image is displayed. The non-display area N/A is disposed to surround an outer periphery of the display area A/A. The non-display area N/A is an area in which various lines, a drive circuit, and the like are disposed to operate the subpixels disposed in the display area A/A.

In the display device 100, the data line can be disposed in the display area A/A, and a scan drive circuit part can be provided in the non-display area N/A and disposed in a direction parallel to the data line in the display area A/A. The scan drive circuit part can include the scan driver SD, the light-emitting driver ED, and the plurality of clock lines SCLK and ECLK disposed in the direction parallel to the data line and provided along at least one side of the display area A/A. The scan driver SD can include first and second scan drivers SD1 and SD2 configured to output scan signals to a plurality of scan lines that is a type of gate line. The light-emitting driver ED can include first and second light-emitting drivers ED1 and ED2 configured to output light-emitting control signals to a plurality of light-emitting control lines that is another type of gate line.

The first scan driver SD1, the second scan driver SD2, the first light-emitting driver ED1, and the second light-emitting driver ED2 can each be implemented as a GIP type and disposed in a GIP area in the non-display area N/A of the substrate 110. Alternatively, some of the first scan driver SD1, the second scan driver SD2, the first light-emitting driver ED1, and the second light-emitting driver ED2 can be disposed in a left outer peripheral region of the non-display area N/A to the left of the display area A/A, and the remaining components, among the first scan driver SD1, the second scan driver SD2, the first light-emitting driver ED1, and the second light-emitting driver ED2, can be disposed in a right outer peripheral region of the non-display area N/A to the right of the display area A/A. Specifically, as illustrated in FIG. 2A, a first scan driver SD1 and a first light-emitting driver ED1 can be disposed in the left outer peripheral region of the non-display area N/A to the left to the display area A/A, and a second scan driver SD2 and a second light-emitting driver ED2 can be disposed in the right outer peripheral region of the non-display area N/A to the right to the display area A/A.

In the scan drive circuit part, the plurality of lines SCLK and ECLK disposed along one side of the display area A/A can be provided between the scan driver SD and the light-emitting driver ED and between the light-emitting driver ED and the edge of the substrate 110 and disposed in the direction parallel to the data line. Gate control lines connected to the scan driver SD can be disposed between the scan driver SD and the light-emitting driver ED. The gate control lines can include a gate start pulse line, the scan clock line SCLK, a gate high voltage line, a gate low voltage line, and the like that serve to operate the scan driver. For the convenience of illustration, FIG. 2A illustrates only the scan clock line SCLK among the gate control lines.

Light-emitting control lines connected to the light-emitting driver ED can be disposed between the light-emitting driver ED and the edge of the substrate 110. The light-emitting control lines can include a light-emitting start pulse line, the light-emitting clock line ECLK, a light-emitting node reset voltage line, a light-emitting driver high voltage line, a light-emitting driver low voltage line, and the like that serve to operate the light-emitting driver. For the convenience of illustration, FIG. 2A illustrates only the light-emitting clock line ECLK among the light-emitting control lines.

Referring to FIG. 2B, the touch electrodes 153 and connection parts 152 can be disposed in the display area A/A of the substrate 110. Therefore, the display area A/A can be referred to as a touch sensing area that enables the touch sensing. The sensing line 154c and the plurality of touch routing lines 154a and 154b for transmitting touch driving signals to a touch detection part can be disposed in the non-display area N/A of the substrate 110.

The touch detection part can be disposed on the substrate 110 and include the plurality of touch electrodes 153. Further, the plurality of touch electrodes 153 can include a plurality of first touch electrodes 153a and a plurality of second touch electrodes 153b. The plurality of first touch electrodes 153a can be touch operating electrodes. Further, the plurality of second touch electrodes 153b can be touch detecting electrodes. The plurality of first touch electrodes 153a can be connected in a row direction by first connection parts 152a and thus define a plurality of electrode rows. The plurality of second touch electrodes 153b can be connected in a longitudinal direction by second connection parts 152b and thus define the plurality of electrode columns. In this case, the plurality of first touch electrodes 153a and the plurality of second touch electrodes 153b are illustrated as being disposed in a 4×3 shape. However, the present disclosure is not limited thereto. The plurality of first touch electrodes 153a can receive the touch driving signal. The plurality of second touch electrodes 153b can transmit the touch sensing signal corresponding to the touch driving signal. The plurality of first touch electrodes 153a and the plurality of second touch electrodes 153b can be formed on the same layer. However, the present disclosure is not limited thereto.

The first connection part 152a can connect one first touch electrode 153a to another first touch electrode 153a. In addition, the second connection part 152b can connect one second touch electrode 153b to another second touch electrode 153b. The first connection part 152a and the second connection part 152b can be disposed to intersect each other with an insulating layer interposed therebetween. For example, in the case in which the plurality of first touch electrodes 153a and the plurality of second touch electrodes 153b are disposed on the same layer, the first connection parts 152a configured to connect the plurality of first touch electrodes 153a can be formed on a layer different from the layer on which the plurality of first touch electrodes 153a and the plurality of second touch electrodes 153b are formed so that the plurality of first touch electrodes 153a and the plurality of second touch electrodes 153b are not directly connected. Therefore, the first connection part 152a can be referred to as a connection electrode.

Further, the first connection parts 152a can be connected to the plurality of first touch electrodes 153a through contact holes. Further, the second connection parts 152b configured to connect the plurality of second touch electrodes 153b can be disposed on the same layer as the plurality of first touch electrodes 153a and the plurality of second touch electrodes 153b. The second connection parts 152b can be integrally connected to the plurality of second touch electrodes 153b. Therefore, the insulating layer can be disposed between the first connection parts 152a configured to connect the plurality of first touch electrodes 153a and the second connection parts 152b configured to connect the plurality of second touch electrodes 153b.

In addition, the plurality of first touch electrodes 153a and the plurality of second touch electrodes 153b can be formed by patterning metal layers having conductivity. In addition, the plurality of first touch electrodes 153a and the plurality of second touch electrodes 153b can be made of a transparent material such as indium tin oxide (ITO). In addition, the plurality of patterned first touch electrodes 153a and the plurality of patterned second touch electrodes 153b can include electrode patterns formed in a mesh shape. The plurality of first touch electrodes 153a and the plurality of second touch electrodes 153b can include a plurality of opening portions. The light emitted from the display device 100 can pass through the plurality of first touch electrodes 153a and the plurality of second touch electrodes 153b and propagate to the outside. However, the present disclosure is not limited thereto. The light emitted from the display device 100 can propagate to the outside through the plurality of opening portions included in the plurality of first touch electrodes 153a and the plurality of second touch electrodes 153b.

The patterns of the plurality of first touch electrodes 153a and the plurality of second touch electrodes 153b formed in a mesh shape can be referred to as touch electrode lines. Further, the plurality of first touch electrodes 153a can be connected to the plurality of touch routing lines 154a and 154b that allow driving signals for operating the plurality of first touch electrodes 153a to be applied to the touch electrodes 153. Further, the plurality of second touch electrodes 153b can be connected to the plurality of sensing lines 154c that transmit sensing signals generated correspondingly to the touching detected by the touch electrodes 153. In this case, the plurality of touch routing lines 154a and 154b can be RX touch routing lines (i.e., receiving touch routing lines). For example, the plurality of first touch electrodes 153a connected to the plurality of touch routing lines 154a and 154b can be RX touch electrodes (i.e., receiving touch electrodes).

Referring to FIG. 2C, the touch detection part including the touch electrodes 153 and the connection parts 152 can be disposed in the display area A/A of the substrate 110. The plurality of touch routing lines 154a and 154b, the plurality of sensing lines 154c, the scan driver SD, the light-emitting driver ED, the plurality of lines SCLK and ECLK, and the like can be disposed in the non-display area N/A of the substrate 110.

The plurality of touch routing lines 154a and 154b can be connected to the plurality of first touch electrodes 153a and extend in a row direction and disposed in a direction in which the plurality of first touch electrodes 153a are arranged. The plurality of touch routing lines 154a and 154b are bent so as not to overlap the remaining touch routing lines 154a and 154b, and then the plurality of touch routing lines 154a and 154b can extend in the direction parallel to the data line in the display area A/A. However, the line shapes of the plurality of touch routing lines 154a and 154b are not limited thereto. Therefore, the plurality of touch routing lines 154a and 154b can be disposed to overlap partial regions of the scan driver SD, the light-emitting driver ED, the scan clock line SCLK, and the light-emitting clock line ECLK in the non-display area N/A.

Figure 3:
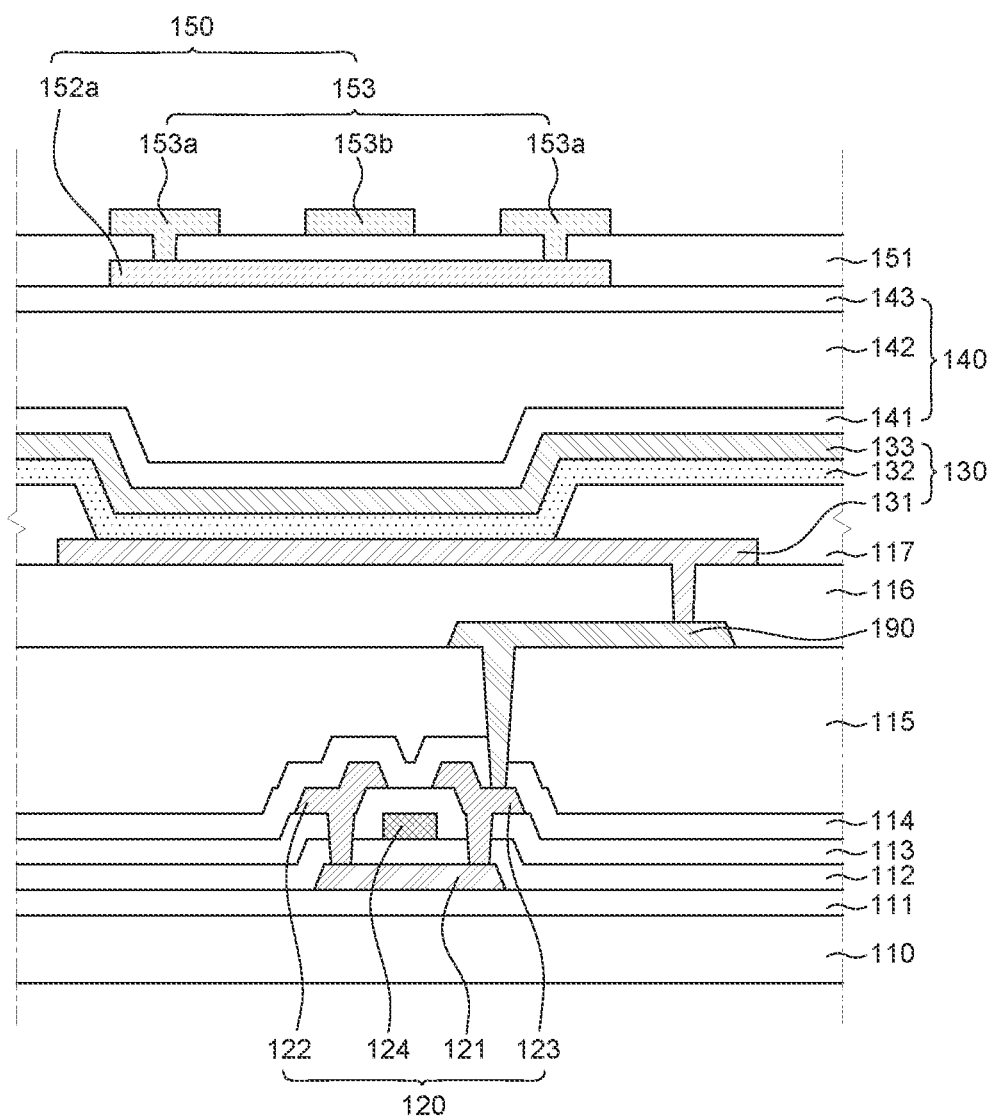
FIG. 3 is a cross-sectional view illustrating the display device according to the embodiment of the present disclosure.

FIG. 3 is a cross-sectional view illustrating the display device according to the embodiment of the present disclosure.

Referring to FIG. 3, the display device 100 according to the embodiment of the present disclosure can include the substrate 110, a buffer layer 111, a first thin-film transistor 120, a gate insulating layer 112, an interlayer insulating layer 113, a passivation layer 114, a first planarization layer 115, a connection electrode 190, a second planarization layer 116, a bank 117, a light-emitting element 130, a sealing part 140, a touch insulating layer 151, and a touch detection part 150.

The substrate 110 can support various constituent elements of the display device 100. The substrate 110 can be made of glass or a plastic material having flexibility. In the case in which the substrate 110 is made of a plastic material, the substrate 110 can be made of polyimide (PI), for example.

The buffer layer 111 can be disposed on the substrate 110. The buffer layer 111 can be a single layer made of silicon nitride (SiNx) or silicon oxide (SiOx) or a multilayer including the above-mentioned layers. The buffer layer 111 can serve to increase bonding forces between the substrate 110 and layers formed on the buffer layer 111 and block a leak of an alkaline material from the substrate 110.

The thin-film transistor 120 can be disposed on the buffer layer 111. The thin film transistor 120 can include an active layer 121, a gate electrode 124, a source electrode 122, and a drain electrode 123. In this case, in accordance with design of a pixel circuit, the source electrode 122 can be the drain electrode, and the drain electrode 123 can be the source electrode. The active layer 121 of the thin-film transistor 120 can be disposed on the buffer layer 111.

The active layer 121 can be made of various materials such as polysilicon, amorphous silicon, an oxide semiconductor, and the like. The active layer 121 can include a channel region in which a channel is formed when the thin-film transistor 120 operates, and source and drain regions disposed at two opposite sides of the channel region. The source region means a portion of the active layer 121 connected to the source electrode 122. The drain region means a portion of the active layer 121 connected to the drain electrode 123.

The gate insulating layer 112 can be disposed on the active layer 121 of the thin-film transistor 120. The gate insulating layer 112 can be a single layer made of silicon nitride (SiNx) or silicon oxide (SiOx) or a multilayer including the above-mentioned layers. The gate insulating layer 112 can have a contact hole through which the source electrode 122 and the drain electrode 123 of the thin film transistor 120 are connected to the source and drain regions of the active layer 121 of the thin film transistor 120.

The gate electrode 124 of the thin-film transistor 120 can be disposed on the gate insulating layer 112. The gate electrode 124 can be configured as a single layer or multilayer made of any one of molybdenum (Mo), copper (Cu), titanium (Ti), aluminum (Al), chromium (Cr), gold (Au), nickel (Ni), neodymium (Nd), and an alloy thereof. The gate electrode 124 can be formed on the gate insulating layer 112 and overlap the channel region of the active layer 121 of the thin film transistor 120.

The interlayer insulating layer 113 can be disposed on the gate insulating layer 112 and the gate electrode 124. The interlayer insulating layer 113 can be a single layer made of silicon nitride (SiNx) or silicon oxide (SiOx) or a multilayer including the above-mentioned layers. The interlayer insulating layer 113 can have a contact hole through which the source and drain regions of the active layer 121 of the thin film transistor 120 are exposed.

The source electrode 122 and the drain electrode 123 of the thin-film transistor 120 can be disposed on the interlayer insulating layer 113.

The source electrode 122 and the drain electrode 123 of the thin film transistor 120 can be connected to the active layer 121 of the thin film transistor 120 through the contact holes formed in the gate insulating layer 112 and the interlayer insulating layer 113. Therefore, the source electrode 122 of the thin film transistor 120 can be connected to the source region of the active layer 121 through the contact holes formed in the gate insulating layer 112 and the interlayer insulating layer 113. Further, the drain electrode 123 of the thin film transistor 120 can be connected to the drain region of the active layer 121 through the contact holes formed in the gate insulating layer 112 and the interlayer insulating layer 113.

The source electrode 122 and the drain electrode 123 of the thin-film transistor 120 can be formed by the same process. Further, the source electrode 122 and the drain electrode 123 of the thin-film transistor 120 can be made of the same material. The source electrode 122 and the drain electrode 123 of the thin-film transistor 120 can each be configured as a single layer or multilayer made of any one of molybdenum (Mo), copper (Cu), titanium (Ti), aluminum (Al), chromium (Cr), gold (Au), nickel (Ni), and neodymium (Nd) or an alloy thereof.

The passivation layer 114 for protecting the source electrode 122 and the drain electrode 123 can be disposed on the source electrode 122 and the drain electrode 123. The passivation layer 114 is an insulating layer for protecting the components disposed below the passivation layer 114. For example, the passivation layer 114 can be configured as a single layer or multilayer made of silicon oxide (SiOx) or silicon nitride (SiNx). However, the present disclosure is not limited thereto. In addition, the passivation layer 114 can be eliminated in accordance with the embodiments.

The first planarization layer 115 can be disposed on the thin-film transistor 120 and the passivation layer 114. As illustrated in FIG. 3, the first planarization layer 115 can have a contact hole through which the drain electrode 123 is exposed. The first planarization layer 115 can be an organic material layer for flattening an upper portion of the thin-film transistor 120. For example, the first planarization layer 115 can be made of an organic material such as acrylic resin, epoxy resin, phenolic resin, polyamide resin, and polyimide resin. However, the present disclosure is not limited thereto. The first planarization layer 115 can be an inorganic material layer for protecting the thin-film transistor 120. For example, the first planarization layer 115 can be made of an inorganic material such as silicon nitride (SiNx) or silicon oxide (SiOx). The first planarization layer 115 can be a single layer made of silicon nitride (SiNx) or silicon oxide (SiOx) or a multilayer including the above-mentioned layers.

The connection electrode 190 can be disposed on the first planarization layer 115. Further, the connection electrode 190 can be connected to the drain electrode 123 of the thin-film transistor 120 through the contact hole of the first planarization layer 115. The connection electrode 190 can serve to electrically connect the thin-film transistor 120 and the light-emitting element 130. For example, the connection electrode 190 can serve to electrically connect the drain electrode 123 of the thin film transistor 120 and a first electrode 131 of the light-emitting element 130. The connection electrode 190 can be configured as a single layer or multilayer made of any one of molybdenum (Mo), copper (Cu), titanium (Ti), aluminum (Al), chromium (Cr), gold (Au), nickel (Ni), neodymium (Nd), and an alloy thereof. The connection electrode 190 can be made of the same material as the source electrode 122 and the drain electrode 123 of the thin film transistor 120.

The second planarization layer 116 can be disposed on the connection electrode 190 and the first planarization layer 115. Further, as illustrated in FIG. 3, the second planarization layer 116 can have a contact hole through which the connection electrode 190 is exposed. The second planarization layer 116 can be an organic material layer for flattening an upper portion of the thin-film transistor 120. For example, the second planarization layer 116 can be made of an organic material such as acrylic resin, epoxy resin, phenolic resin, polyamide resin, and polyimide resin.

The light-emitting element 130 can be disposed on the second planarization layer 116. The light-emitting element 130 can include the first electrode 131, a light-emitting structure 132, and a second electrode 133. The first electrode 131 of the light-emitting element 130 can be disposed on the second planarization layer 116. The first electrode 131 can be electrically connected to the connection electrode 190 through the contact hole formed in the second planarization layer 116. Therefore, the first electrode 131 of the light-emitting element 130 can be connected to the connection electrode 190 through the contact hole formed in the second planarization layer 116, such that the first electrode 131 can be electrically connected to the thin-film transistor 120.

The first electrode 131 can have a multilayered structure including a transparent conductive film and an opaque conductive film having high reflection efficiency. The transparent conductive film can be made of a material such as indium-tin-oxide (ITO) or indium-zinc-oxide (IZO) having a comparatively large work function value. Further, the opaque conductive film can have a single-layered or multi-layered structure made of Al, Ag, Cu, Pb, Mo, Ti, or an alloy thereof. For example, the first electrode 131 can have a structure in which the transparent conductive film, the opaque conductive film, and the transparent conductive film are sequentially stacked. However, the present disclosure is not limited thereto. The first electrode can have a structure in which the transparent conductive film and the opaque conductive film are sequentially stacked.

Because the display device 100 according to the embodiment of the present disclosure is a top emission display device, the first electrode 131 can be an anode electrode. When the display device 100 is a bottom emission display device, the first electrode 131 disposed on the second planarization layer 116 can be a cathode electrode.

The bank 117 can be disposed on the first electrode 131 and the second planarization layer 116. The bank 117 can have an opening portion through which the first electrode 131 is exposed. Because the bank 117 can define a light-emitting region of the display device 100, the bank can be referred to as a pixel definition film.

The light-emitting structure 132 including a light-emitting layer can be disposed on the first electrode 131.

The light-emitting structure 132 of the light-emitting element 130 can be formed by stacking a positive hole layer, a light-emitting layer, and an electron layer in this order or in the reverse order on the first electrode 131. In addition, the light-emitting structure 132 can have first and second light-emitting structures facing each other with a charge generation layer interposed therebetween. In this case, the light-emitting layer of any one of the first and second light-emitting structures emits blue light, and the light-emitting layer of the other of the first and second light-emitting structures emits yellow-green light. Therefore, white light can be emitted by the first and second light-emitting structures. The white light emitted by the light-emitting structure 132 can enter a color filter positioned on an upper portion of the light-emitting structure 132, thereby implementing a color image. In addition, the light-emitting structures 132 can each emit color light corresponding to each subpixel, thereby implementing a color image without a separate color filter. For example, the light-emitting structure 132 for a red (R) subpixel can emit red light, the light-emitting structure 132 for a green (G) subpixel can emit green light, and the light-emitting structure 132 for a blue (B) subpixel can emit blue light.

The second electrode 133 can be further disposed on the light-emitting structure 132. The second electrode 133 of the light-emitting element 130 can be disposed on the light-emitting structure 132 and face the first electrode 131 with the light-emitting structure 132 interposed therebetween. In the display device 100 according to the embodiment of the present disclosure, the second electrode 133 can be a cathode electrode. The sealing part 140 for suppressing the penetration of moisture can be further disposed on the second electrode 133.

The sealing part 140 can include a first inorganic sealing layer 141, an organic sealing layer 142, and a second inorganic sealing layer 143. The first inorganic sealing layer 141 of the sealing part 140 can be disposed on the second electrode 133. Further, the organic sealing layer 142 can be disposed on the first inorganic sealing layer 141. In addition, the second inorganic sealing layer 143 can be disposed on the organic sealing layer 142. The first inorganic sealing layer 141 and the second inorganic sealing layer 143 of the sealing part 140 can each be made of an inorganic material such as silicon nitride (SiNx) or silicon oxide (SiOx). The organic sealing layer 142 of the sealing part 140 can be made of an organic material such as acrylic resin, epoxy resin, phenolic resin, polyamide resin, and polyimide resin.

The touch detection part 150 can be disposed on the second inorganic sealing layer 143 of the sealing part 140. The touch detection part 150 can include the touch electrode 153 and the connection part 152.

The connection part 152 of the touch detection part 150 can be disposed on the second inorganic sealing layer 143. For example, the first connection part 152a of the connection part 152 can be disposed on the second inorganic sealing layer 143. The first connection part 152a can be configured as a single layer or multilayer made of any one of molybdenum (Mo), copper (Cu), titanium (Ti), aluminum (Al), chromium (Cr), gold (Au), nickel (Ni), neodymium (Nd), and an alloy thereof. However, the present disclosure is not limited thereto. The first connection part 152a can be configured as a transparent conductive film made of indium-tin-oxide (ITO) or indium-zinc-oxide (IZO). A bottom surface of the first connection part 152a of the connection part 152 can be in direct contact with a top surface of the sealing part 140. For example, the bottom surface of the first connection part 152a can be in direct contact with the second inorganic sealing layer 143 of the sealing part 140.

The touch insulating layer 151 can be disposed on the sealing part 140 and the first connection part 152a. For example, the touch insulating layer 151 can be disposed on the first connection part 152a and the second inorganic sealing layer 143 of the sealing part 140. Further, the touch insulating layer 151 can be configured as an inorganic substance layer or an organic substance layer. In the case in which the touch insulating layer 151 is the inorganic substance layer, the touch insulating layer 151 can be a single layer made of silicon nitride (SiNx) or silicon oxide (SiOx) or a multilayer including the above-mentioned layers. Further, in the case in which the touch insulating layer 151 is the organic substance layer, the touch insulating layer 151 can be made of an organic material such as acrylic resin, epoxy resin, phenolic resin, polyamide resin, and polyimide resin. The touch insulating layer 151 can have a contact hole through which the first connection part 152a is exposed.

The plurality of first touch electrodes 153a and the plurality of second touch electrodes 153b of the touch electrodes 153 can be disposed on the touch insulating layer 151. Further, although not illustrated in the drawings, the second connection part 152b can also be disposed on the touch insulating layer 151. Further, the second connection parts 152b can connect the plurality of second touch electrodes 153b. The second connection part 152b can be disposed on the same layer as the plurality of first touch electrodes 153a and the plurality of second touch electrodes 153b.

The plurality of first touch electrodes 153a can be connected to the first connection parts 152a through contact holes of the touch insulating layer 151. The plurality of first touch electrodes 153a can be connected to one another by the first connection parts 152a.

The first touch electrode 153a and the second touch electrode 153b of the touch electrodes 153 can each be configured as a transparent conductive film made of indium-tin-oxide (ITO) or indium-zinc-oxide (IZO). However, the present disclosure is not limited thereto. The first touch electrode 153a and the second touch electrode 153b can each be configured as an opaque conductive film having an opening portion. In the case in which the first touch electrode 153a and the second touch electrode 153b are each configured as an opaque conductive film having an opening portion, the first touch electrode 153a and the second touch electrode 153b can each be configured as a single layer or multilayer made of any one of molybdenum (Mo), copper (Cu), titanium (Ti), aluminum (Al), chromium (Cr), gold (Au), nickel (Ni), neodymium (Nd), and an alloy thereof.

Figure 4:
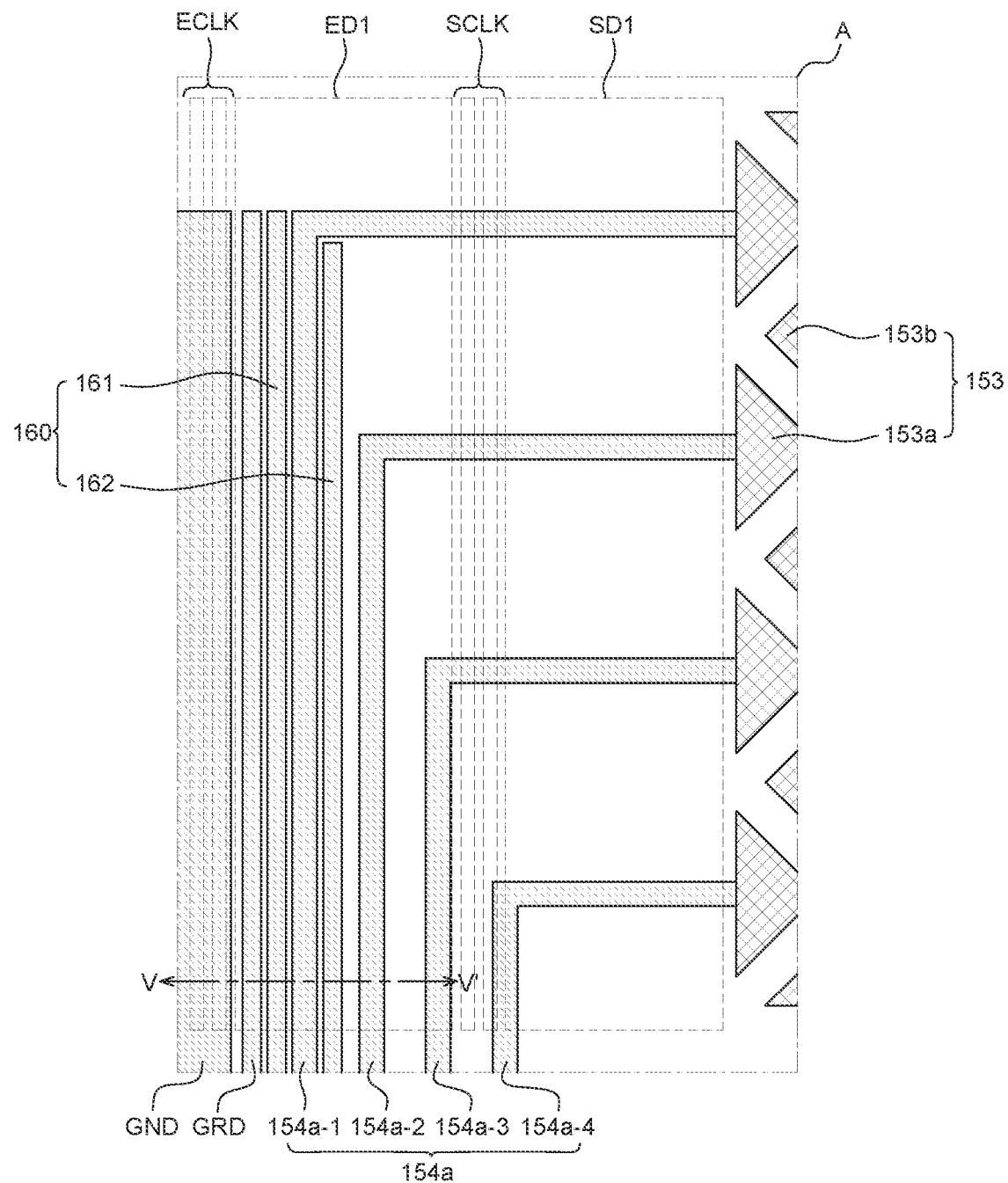
FIG. 4 is an enlarged view of area A in FIG. 2C.
Figure 5:
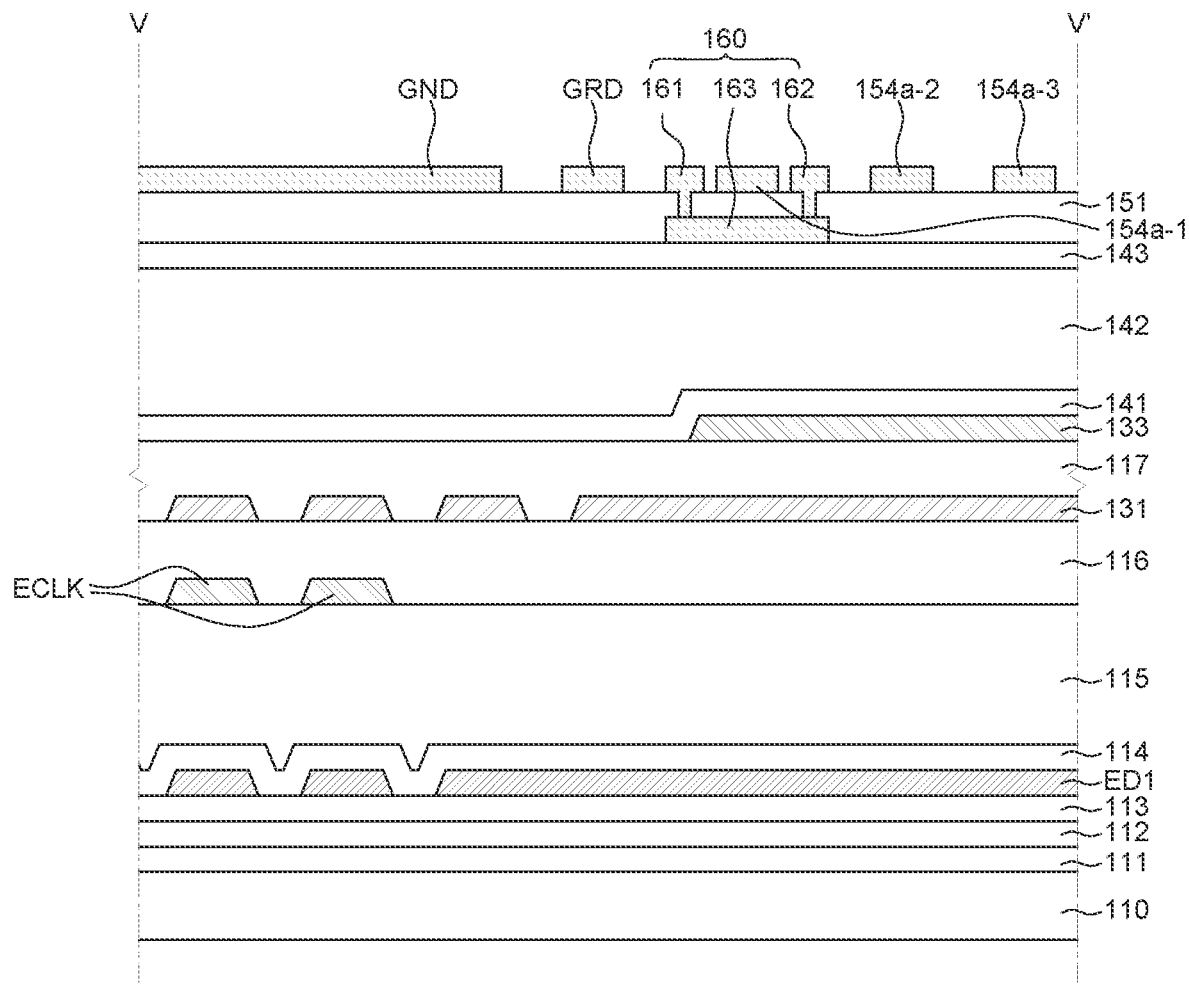
FIG. 5 is a cross-sectional view taken along line V-V' in FIG. 4.

FIG. 4 is an enlarged view of area A in FIG. 2C. FIG. 5 is a cross-sectional view taken along line V-V' in FIG. 4. The area A in FIG. 2C is an enlarged area including the non-display area N/A and a partial region of the display area A/A illustrated in FIG. 2C.

For the convenience of illustration, FIG. 4 illustrates some components such as the plurality of touch routing lines 154a, a shield part 160, and the light-emitting driver ED1 among various constituent elements of the display device 100.

Referring to FIGS. 4 and 5, the first scan driver SD1, the scan clock line SCLK, the first light-emitting driver ED1, and the light-emitting clock line ECLK can be disposed in the left outer peripheral region of the non-display area N/A to the left to the display area A/A. In this case, the first scan driver SD1, the scan clock line SCLK, the first light-emitting driver ED1, and the light-emitting clock line ECLK are illustrated as being disposed between the interlayer insulating layer 113 and the passivation layer 114. However, the present disclosure is not limited thereto.

For example, the first scan driver SD1, the scan clock line SCLK, the first light-emitting driver ED1, and the light-emitting clock line ECLK can be disposed between the first planarization layer 115 and the second planarization layer 116.

Alternatively, some of the first scan driver SD1, the scan clock line SCLK, the first light-emitting driver ED1, and the light-emitting clock line ECLK can be disposed between the interlayer insulating layer 113 and the passivation layer 114, and the remaining components, among the first scan driver SD1, the scan clock line SCLK, the first light-emitting driver ED1, and the light-emitting clock line ECLK, can be disposed between the first planarization layer 115 and the second planarization layer 116.

In this case, in a case in which the plurality of lines are disposed between the interlayer insulating layer 113 and the passivation layer 114, the plurality of lines can be made of the same material and formed by the same process as the source electrode 122 and the drain electrode 123 disposed between the interlayer insulating layer 113 and the passivation layer 114 in the display area A/A. In the case in which the plurality of lines are disposed between the first planarization layer 115 and the second planarization layer 116, the plurality of lines can be made of the same material and formed by the same process as the connection electrode 190 disposed between the first planarization layer 115 and the second planarization layer 116 in the display area A/A.

The first electrode 131 of the light-emitting element 130 can be disposed on the second planarization layer 116. However, the first electrode 131 disposed in the non-display area N/A can include a plurality of holes. The plurality of holes can serve to discharge hydrogen ($H_2$) gas that can be produced in the second planarization layer 116. The bank 117 can be disposed on the first electrode 131. Across the display area A/A, the second electrode 133, i.e., the cathode electrode can be disposed on the bank 117. However, the second electrode 133 can extend from the display area A/A. On the other hand, due to a design margin, the second electrode 133 can be disconnected without reaching a region in which a dam is disposed in the non-display area N/A. For example, unlike the first electrode 131, the second electrode 133 can be disposed so as not to overlap a ground line GND. The second electrode 133 can be disposed in partial regions or on at least a part of the first scan driver SD1, the plurality of scan clock lines SCLK, and the first light-emitting driver ED1 in the non-display area N/A.

The first inorganic sealing layer 141, the organic sealing layer 142, and the second inorganic sealing layer 143 of the sealing part 140 can be disposed on the second electrode 133 and the bank 117. Further, the touch insulating layer 151 can be disposed on the second inorganic sealing layer 143 of the sealing part 140.

The plurality of touch electrodes 153 can be disposed on the touch insulating layer 151 in the display area A/A. The plurality of touch routing lines 154a can be disposed on the touch insulating layer 151 in the non-display area N/A.

Referring to FIG. 4, the plurality of touch routing lines 154a can be respectively connected to the plurality of first touch electrodes 153a and include a first touch routing line 154a-1 connected to the first touch electrode 153a positioned at the uppermost side in a plan view; a second touch routing line 154a-2 connected to the first touch electrode 153a positioned in the next row; a third touch routing line 154a-3 connected to the first touch electrode 153a positioned in the next row; and a fourth touch routing line 154a-4 connected to the first touch electrode 153a positioned at the lowermost side in a plan view. The first touch routing line 154a-1 connected to the first touch electrode 153a positioned at the uppermost side in a plan view can be disposed at the outermost periphery among the plurality of touch routing lines 154a. The fourth touch routing line 154a-4 connected to the first touch electrode 153a positioned at the lowermost side in a plan view can be disposed to be closest to the display area A/A among the plurality of touch routing lines 154a. However, the present disclosure is not limited thereto. The number of touch routing lines 154a can be variously designed depending on the number of touch electrodes 153.

In addition, the ground line GND can be disposed between the plurality of touch routing lines 154a and the edge region of the substrate 110. The ground line GND is a line that serves to discharge static electricity, which is generated in the display device 100, to the ground. The ground line GND can be disposed at the outermost periphery among the lines formed on the same layer as the plurality of touch electrodes 153 in the non-display area N/A.

A guard line GRD can be disposed between the ground line GND and the plurality of touch routing lines 154a. The guard line GRD is a line that can serve to block noise entering the first touch routing line 154a-1 from the outside and compensate for a signal of the first touch routing line 154a-1. Like the plurality of touch routing lines 154a and the ground line GND, the guard line GRD can be formed on the same layer as the plurality of touch electrodes 153 in the non-display area N/A.

Next, the shield part 160 can be disposed in the non-display area N/A and surround two opposite sides and a lower side of one touch routing line 154a among the plurality of touch routing lines 154a.

Referring to FIGS. 4 and 5, the shield part 160 can include a first shield line 161, a second shield line 162, and a third shield line 163. The first shield line 161 can be disposed between the guard line GRD and the first touch routing line 154a-1, i.e., disposed at one side of the first touch routing line 154a-1. The second shield line 162 can be disposed between the first touch routing line 154a-1 and the second touch routing line 154a-2, i.e., disposed at the other side of the first touch routing line 154a-1. The third shield line 163 can be disposed below the first touch routing line 154a-1 and connect the first shield line 161 and the second shield line 162.

The first shield line 161 and the second shield line 162 can be disposed on the same layer as the plurality of touch electrodes 153 in the non-display area N/A. The third shield line 163 can be disposed on the same layer as the first connection part 152a, i.e., the connection electrode 152. Therefore, the touch insulating layer 151 can be disposed between the first shield line 161, the second shield line 162, and the third shield line 163. However, a contact hole can be formed in the touch insulating layer 151 so that the third shield line 163 can be electrically connected to the first shield line 161 and the second shield line 162.

Therefore, in the display device 100 according to the embodiment of the present disclosure, the shield part 160 capable of blocking driving signal noise is disposed, which makes it possible to reduce noise and enable stable touch sensing.

When the driving signals, which can be generated by the light-emitting driver, the light-emitting clock line, and the like, enter the touch routing line, the driving signal acts as noise. For example, interference can occur between the touch detection signal and the driving signal that can be generated by the light-emitting driver, the light-emitting clock line, and the like, and the interference causes contact between the touch routing lines, which leads to a problem of touch noise of the touch detection part.

The driving signal, which can be generated by the light-emitting driver, the light-emitting clock line, and the like, can be partially blocked by the first and second electrodes disposed above the light-emitting driver and the light-emitting clock line. However, because the first electrode, i.e., the anode electrode includes the plurality of holes for discharging hydrogen gas that can be produced in the planarization layer, the driving signal can pass through the plurality of holes of the first electrode. In addition, because of a design margin, the second electrode, i.e., the cathode electrode can extend only to the partial region in the non-display area to the extent that the second electrode does not overlap the ground line, and then the second electrode can be disconnected.

In particular, a process of depositing the second electrode uses a process method of performing deposition on the entire surface by using an open mask without performing photo and etching processes for forming patterns. For this reason, an end of the second electrode in the non-display area has large process tolerance and a desired position of the second electrode may not be covered. For this reason, in the related art, the second electrode cannot serve as a shield between the touch routing line and the light-emitting clock line when the second electrode is not sufficiently deposited to overlap the touch routing line disposed at the outermost periphery among the plurality of touch routing lines. For this reason, there can be a limitation in that the driving signals generated by the light-emitting clock line and the light-emitting driver reach the touch routing line. For example, in the related art, there can be a limitation in that the driving signal enters the touch routing line and can cause a touch noise issue/defect because of a design margin of the second electrode.

Therefore, in the display device 100 according to the embodiment of the present disclosure, the touch precision can be improved because the shield part 160 is disposed to surround the two opposite sides and the lower side of the first touch routing line 154a-1 disposed at the outermost periphery among the plurality of touch routing lines 154a. As described above, when some of the driving signals generated by the first light-emitting driver ED1 and the light-emitting clock line ECLK pass through the first electrode 131 and the second electrode 133 and enter the plurality of touch routing lines 154a, the driving signals can act as noise and cause a defect. In particular, among the plurality of touch routing lines 154a, the first touch routing line 154a-1 can be more vulnerable to a touch noise defect because the first touch routing line 154a-1 is positioned at the outermost periphery and disposed to be closest to the light-emitting clock line ECLK.

In this case, the driving signal generated by the light-emitting clock line ECLK and the like can be blocked when the first shield line 161 is disposed at one side of the first touch routing line 154a-1, the second shield line 162 is disposed at the other side of the first touch routing line 154a-1, and the third shield line 163 connected to the first shield line 161 and the second shield line 162 through the contact hole is disposed to surround the lower side of the first touch routing line 154a-1.

In particular, because the third shield line 163 is connected to the first shield line 161 and the second shield line 162 through the contact hole formed in the touch insulating layer 151, the shield part 160 can perfectly block noise that can enter between the first shield line 161, the second shield line 162, and the third shield line 163. When noise such as the driving signal does not enter the first touch routing line 154a-1, a signal-to-noise ratio of the touch signal increases, and interference between the signals does not occur, such that the touch sensing accuracy can be improved. For example, because the shield part 160 is disposed to surround the first touch routing line 154a-1, it is possible to suppress a touch noise defect and improve touch sensitivity, thereby providing a more stable touch detection system.

Figure 6:
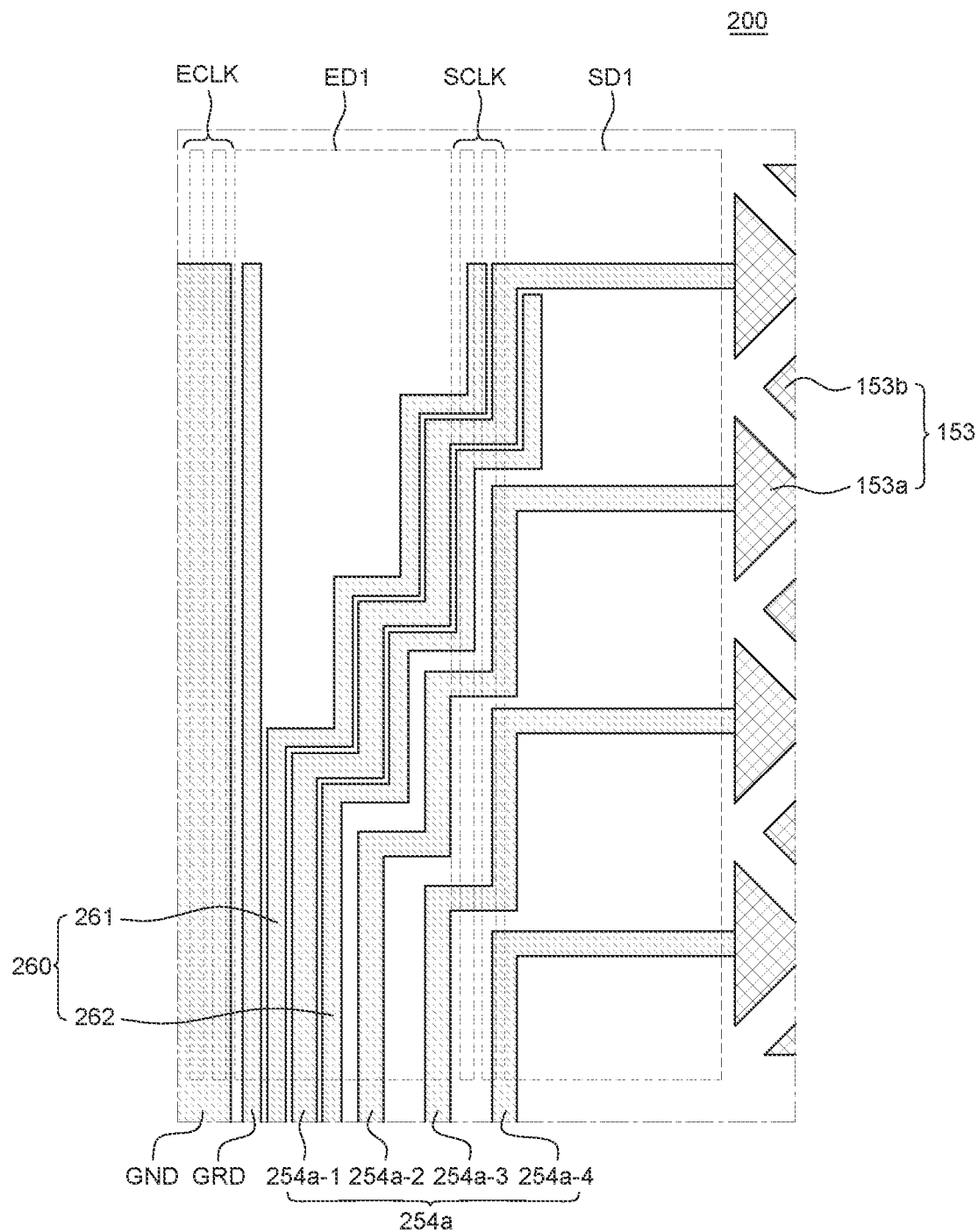
FIG. 6 is an enlarged top plan view of a display device according to another embodiment of the present disclosure.

FIG. 6 is an enlarged top plan view of a display device according to another embodiment of the present disclosure.

Referring to FIG. 6, a display device 200 according to another embodiment of the present disclosure is substantially identical in configuration to the display device 100 illustrated in FIGS. 1 to 5, except for, e.g., a plurality of touch routing lines 254a and a shield part 260. Therefore, repeated descriptions of the identical components will be omitted or may be briefly discussed.

Referring to FIG. 6, the plurality of touch routing lines 254a can be respectively connected to the plurality of first touch electrodes 153a and include a first touch routing line 254a-1 connected to the first touch electrode 153a positioned at the uppermost side in a plan view; a second touch routing line 254a-2 connected to the first touch electrode 153a positioned in the next row; a third touch routing line 254a-3 connected to the first touch electrode 153a positioned in the next row; and a fourth touch routing line 254a-4 connected to the first touch electrode 153a positioned at the lowermost side in a plan view.

The first touch routing line 254a-1 connected to the first touch electrode 153a positioned at the uppermost side in a plan view can be disposed at the outermost periphery among the plurality of touch routing lines 254a. The fourth touch routing line 254a-4 connected to the first touch electrode 153a positioned at the lowermost side in a plan view can be disposed to be closest to the display area A/A among the plurality of touch routing lines 254a. However, the present disclosure is not limited thereto. The number of touch routing lines 254a can be variously designed depending on the number of touch electrodes 153.

The plurality of touch routing lines 254a can be connected to the plurality of first touch electrodes 153a and extend in a row direction and disposed in a direction in which the plurality of first touch electrodes 153a are arranged. The plurality of touch routing lines 254a are bent so as not to overlap the remaining touch routing lines 254a.

As illustrated in FIG. 6, the plurality of touch routing lines 254a can be implemented in a stepped shape in a plane view in accordance with design of the lines. For example, the plurality of touch routing lines 254a can each include vertical portions parallel to the data line in the display area A/A, and horizontal portions perpendicular to the data line in the display area A/A, and the vertical portions and the horizontal portions can be repeatedly disposed. All the plurality of touch routing lines 254a can entirely extend in the direction parallel to the data line of the display area A/A and can include a plurality of bent sections so as not to adjoin the remaining touch routing lines 254a. However, the line shapes of the plurality of touch routing lines 254a are not limited thereto.

Next, the shield part 260 can be disposed in the non-display area N/A and surround two opposite sides and a lower side of one touch routing line 254a among the plurality of touch routing lines 254a. The shield part 260 can include a first shield line 261, a second shield line 262, and a third shield line. The first shield line 261 can be disposed between the guard line GRD and the first touch routing line 254a-1, i.e., disposed at one side of the first touch routing line 254a-1. The second shield line 262 can be disposed between the first touch routing line 254a-1 and the second touch routing line 254a-2, i.e., disposed at the other side of the first touch routing line 254a-1. The third shield line can be disposed below the first touch routing line 254a-1 and connect the first shield line 261 and the second shield line 262.

In addition, the first shield line 261 and the second shield line 262 of the shield part 260 can each have a stepped shape corresponding to the stepped shape of the first touch routing line 254a-1. For example, the first shield line 261 and the second shield line 262 can each include vertical portions parallel to the data line in the display area A/A so as to be parallel to two opposite sides of the first touch routing line 254a-1, and horizontal portions perpendicular to the data line in the display area A/A, and the vertical portions and the horizontal portions can be repeatedly disposed. Both the first shield line 261 and the second shield line 262 can entirely extend in the direction parallel to the data line in the display area A/A and can include a plurality of bent sections so as not to adjoin the first touch routing line 254a-1 and the second touch routing line 254a-2. However, the line shape of the shield part 260 is not limited thereto.

Therefore, in the display device 200 according to another embodiment of the present disclosure, the touch precision can be improved because the shield part 260 is disposed to surround the two opposite sides and the lower side of the first touch routing line 254a-1 disposed at the outermost periphery among the plurality of touch routing lines 254a. As described above, when some of the driving signals generated by the first light-emitting driver ED1 and the light-emitting clock line ECLK pass through the first electrode 131 and the second electrode 133 and enter the plurality of touch routing lines 254a, the driving signals can act as noise and cause a defect. In particular, among the plurality of touch routing lines 254a, the first touch routing line 254a-1 can be more vulnerable to a touch noise defect because the first touch routing line 254a-1 is positioned at the outermost periphery and disposed to be closest to the light-emitting clock line ECLK.

In this case, the driving signal generated by the light-emitting clock line ECLK and the like can be blocked when the first shield line 261 is disposed at one side of the first touch routing line 254a-1, the second shield line 262 is disposed at the other side of the first touch routing line 254a-2, and the third shield line connected to the first shield line 261 and the second shield line 262 through the contact hole is disposed to surround the lower side of the first touch routing line 254a-1. In particular, because the third shield line is connected to the first shield line 261 and the second shield line 262 through the contact hole formed in the touch insulating layer 151, the shield part 260 can perfectly block noise that can enter between the first shield line 261, the second shield line 262, and the third shield line.

In addition, even though the vertical portions and the horizontal portions of the plurality of touch routing lines 254a are repeatedly disposed in a stepped shape, it is possible to perfectly block noise because the first shield line 261 and the second shield line 262 can each have the stepped shape corresponding to the stepped shape of the first touch routing line 254a-1.

When noise such as the driving signal does not enter the first touch routing line 254a-1, a signal-to-noise ratio of the touch signal increases, and interference between the signals does not occur, such that the touch sensing accuracy can be improved. For example, because the shield part 260 is disposed to surround the first touch routing line 254a-1 without limitation in line shape of the first touch routing line 254a-1, it is possible to suppress a touch noise defect and improve touch sensitivity, thereby providing the more stable touch detection system.

Figure 7:
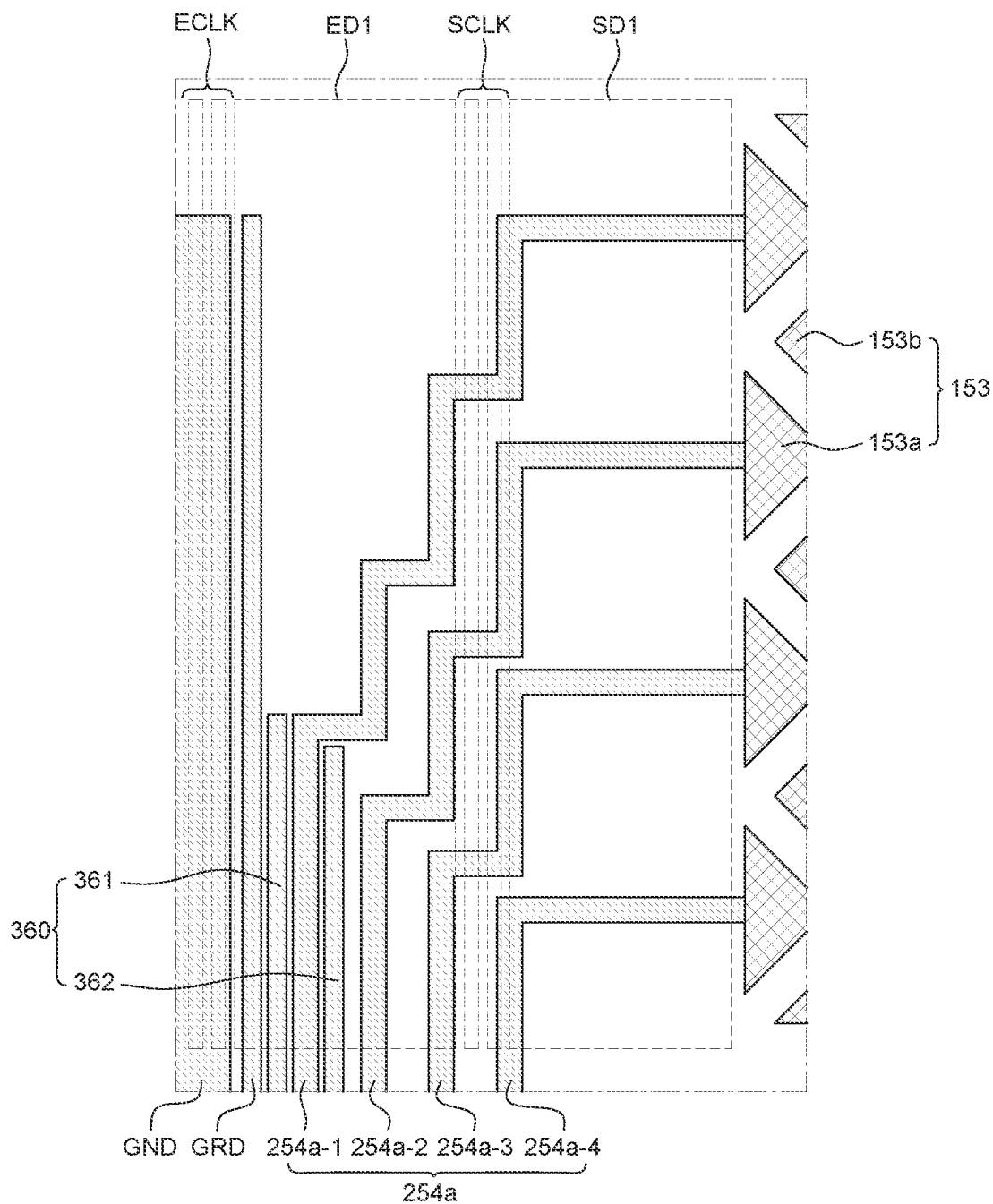
FIG. 7 is an enlarged top plan view of a display device according to still another embodiment of the present disclosure.

FIG. 7 is an enlarged top plan view of a display device according to still another embodiment of the present disclosure.

Referring to FIG. 7, a display device 300 according to still another embodiment of the present disclosure is substantially identical in configuration to the display device 200 illustrated in FIG. 6, except for, e.g., a shield part 360. Therefore, repeated descriptions of the identical components will be omitted or may be briefly discussed.

The shield part 360 can be disposed in the non-display area N/A and surround the two opposite sides and the lower side of one touch routing line 254a among the plurality of touch routing lines 254a. The shield part 360 can include a first shield line 361, a second shield line 362, and a third shield line that is not illustrated in FIG. 7. The first shield line 361 can be disposed between the guard line GRD and the first touch routing line 254a-1, i.e., disposed at one side of the first touch routing line 254a-1. The second shield line 362 can be disposed between the first touch routing line 254a-1 and the second touch routing line 254a-2, i.e., disposed at the other side of the first touch routing line 254a-1. The third shield line can be disposed below the first touch routing line 254a-1 and connect the first shield line 361 and the second shield line 362.

However, the first shield line 361 and the second shield line 362 of the shield part 360 can be disposed only at two opposite surfaces of a partial region of the stepped shape of the first touch routing line 254a-1. For example, the plurality of touch routing lines 254a can be implemented in a stepped shape in accordance with design of the lines. The plurality of touch routing lines 254a can each include the vertical portions parallel to the data line in the display area A/A, and the horizontal portions perpendicular to the data line in the display area A/A, and the vertical portions and the horizontal portions can be repeatedly disposed. Among the plurality of touch routing lines 254a, the first touch routing line 254a-1 is a line disposed at the outermost periphery.

The first touch routing line 254a-1 can include a vertical portion region closest to the guard line GRD. In this case, the first shield line 361 and the second shield line 362 can be disposed at the outermost periphery of the first touch routing line 254a-1 and disposed only at the two opposite sides of the vertical portion region closest to the guard line GRD. For example, the shield part 360 can be disposed to surround only a portion of the first touch routing line 254a-1 farthest from the display area. However, the present disclosure is not limited thereto. The first shield line 361 and the second shield line 362 can be disposed at the two opposite sides of the partial region of the first touch routing line 254a-1 including the vertical portion region of the outermost periphery of the first touch routing line 254a-1.

Therefore, in the display device 300 according to still another embodiment of the present disclosure, the touch precision can be improved because the shield part 360 is disposed to surround the two opposite sides and the lower side of a partial region of the outermost periphery of the first touch routing line 254a-1 disposed at the outermost periphery among the plurality of touch routing lines 254a. As described above, when some of the driving signals generated by the first light-emitting driver ED1 and the light-emitting clock line ECLK pass through the first electrode 131 and the second electrode 133 and enter the plurality of touch routing lines 254a, the driving signals can act as noise and cause a defect. In particular, among the plurality of touch routing lines 254a, the first touch routing line 254a-1 can be more vulnerable to a touch noise defect because the first touch routing line 254a-1 is positioned at the outermost periphery and disposed to be closest to the light-emitting clock line ECLK.

In this case, the driving signal generated by the light-emitting clock line ECLK and the like can be blocked when the first shield line 361 is disposed at one side of a partial region disposed at the outermost periphery of the first touch routing line 254a-1, the second shield line 362 is disposed at the other side of a partial region disposed at the outermost periphery of the first touch routing line 254a-1, and the third shield line connected to the first shield line 361 and the second shield line 362 through the contact hole is disposed to surround the lower side of the first touch routing line 254a-1.

In particular, because the third shield line is connected to the first shield line 361 and the second shield line 362 through the contact hole formed in the touch insulating layer 151, the shield part 360 can perfectly block noise that can enter between the first shield line 361, the second shield line 362, and the third shield line.

In addition, in the case in which the line is implemented in a stepped shape like the plurality of touch routing lines 254a illustrated in FIG. 7, an upper portion of the first touch routing line 254a-1 in a plan view is adjacent to the display area A/A, whereas a lower portion of the first touch routing line 254a-1 in a plan view is adjacent to the guard line GRD and disposed at the outermost periphery on the substrate 110. For example, a partial region of the first touch routing line 254a-1, which is disposed at the outermost periphery, is most vulnerable to noise. Therefore, it is possible to sufficiently and efficiently block noise even though the first shield line 361 and the second shield line 362 are disposed only at the two opposite surfaces of the partial region of the outermost periphery of the first touch routing line 254a-1.

When noise such as the driving signal does not enter the first touch routing line 254a-1, a signal-to-noise ratio of the touch signal increases, and interference between the signals does not occur, such that the touch sensing accuracy can be improved. For example, because the shield part 360 is disposed to surround a partial region of the outermost periphery of the first touch routing line 254a-1 without limitation in line shape of the first touch routing line 254a-1, it is possible to suppress a touch noise defect and improve touch sensitivity, thereby more efficiently providing the stable touch detection system.

Figure 8:
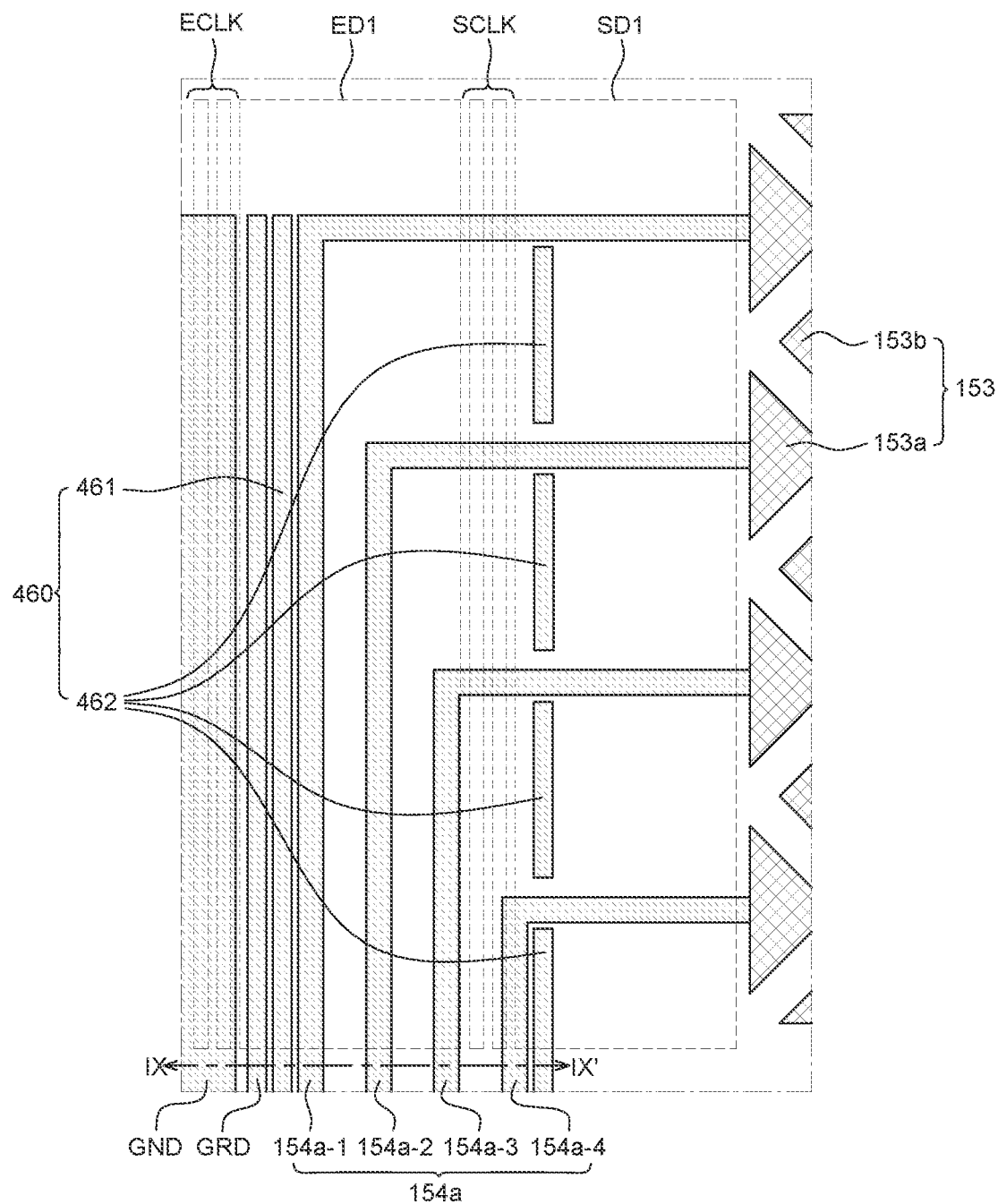
FIG. 8 is an enlarged top plan view of a display device according to yet another embodiment of the present disclosure.
Figure 9:
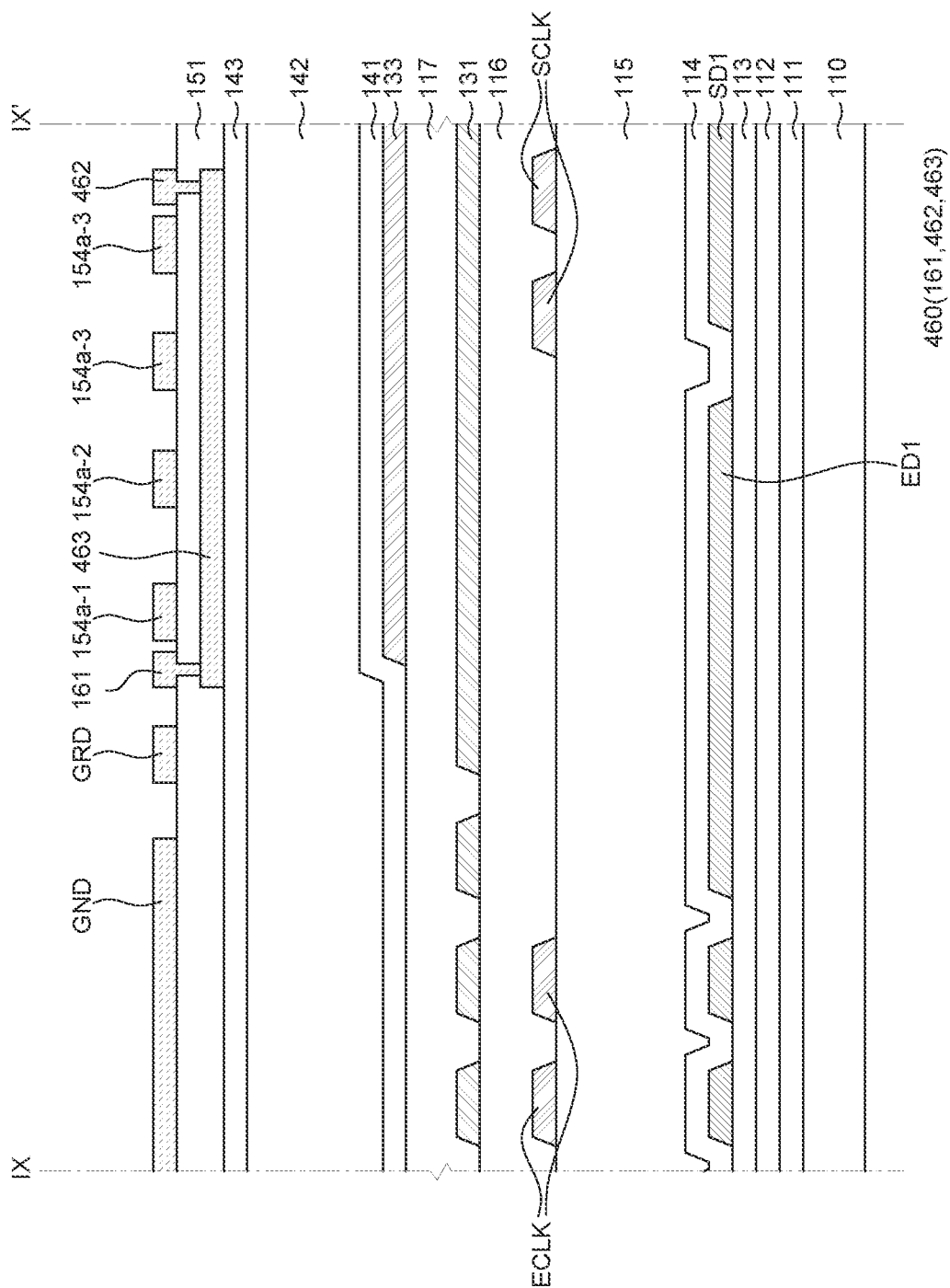
FIG. 9 is a cross-sectional view taken along line IX-IX' in FIG. 8.

FIG. 8 is an enlarged top plan view of a display device according to yet another embodiment of the present disclosure. FIG. 9 is a cross-sectional view taken along line IX-IX' in FIG. 8.

Referring to FIGS. 8 and 9, a display device 400 according to yet another embodiment of the present disclosure is substantially identical in configuration to the display device 100 illustrated in FIGS. 1 to 5, except for, e.g., a shield part 460. Therefore, repeated descriptions of the identical components will be omitted or may be briefly provided.

The shield part 460 can be disposed in the non-display area N/A and surround two opposite sides and a lower side of the plurality of touch routing lines 154a including the first touch routing line 154a-1. Referring to FIGS. 8 and 9, the shield part 460 can include a first shield line 461, a second shield line 462, and a third shield line 463. The first shield line 461 can be disposed between the guard line GRD and the first touch routing line 154a-1, i.e., disposed at one side of the first touch routing line 154a-1. The second shield line 462 can be disposed between the fourth touch routing line 154a-4 and the display area A/A, i.e., disposed at the other side of the fourth touch routing line 154a-4. However, the second shield line 462 is not limited as being disposed at the other side of the fourth touch routing line 154a-4.

The second shield line 462 can be disposed at the other side of the second touch routing line 154a-2 or the other side of the third touch routing line 154a-3. The third shield line 463 can be disposed below the plurality of touch routing lines 154a and connect the first shield line 461 and the second shield line 462. For example, the shield part 460 is disposed to surround the two opposite sides and the lower side of the plurality of touch routing lines 154a instead of the single touch routing line. Therefore, the third shield line 463 can extend long in order to connect the first shield line 461 and the second shield line 462. However, the third shield line 463 is not limited as being disposed to overlap all the touch routing lines 154a.

The number of touch routing lines 154a, which overlap the third shield line 463, can be variously designed depending on the position at which the second shield line 462 is disposed. For example, the shield part 460 can be disposed to surround the two or more touch routing lines 154a disposed at the outermost periphery on the substrate 110 among the plurality of touch routing lines 154a and can also be disposed to surround all the plurality of touch routing lines 154a.

Therefore, in the display device 400 according to yet another embodiment of the present disclosure, the touch precision can be improved because the shield part 460 is disposed to surround the two opposite sides and the lower side of the plurality of touch routing lines 154a including the first touch routing line 154a-1.

As described above, when some of the driving signals generated by the first light-emitting driver ED1 and the light-emitting clock line ECLK pass through the first electrode 131 and the second electrode 133 and enter the plurality of touch routing lines 154a, the driving signals can act as noise and cause a defect. In particular, among the plurality of touch routing lines 154a, the first touch routing line 154a-1 can be more vulnerable to a touch noise defect because the first touch routing line 154a-1 is positioned at the outermost periphery and disposed to be closest to the light-emitting clock line ECLK.

In this case, the driving signal generated by the light-emitting clock line ECLK and the like can be more perfectly blocked when the first shield line 461 is disposed at one side of the first touch routing line 154a-1, the second shield line 462 is disposed at the other side of the fourth touch routing line 154a-4, and the third shield line 463 connected to the first shield line 461 and the second shield line 462 through the contact hole is disposed to surround the lower side of the plurality of touch routing lines 154a.

In particular, because the third shield line 463 is connected to the first shield line 461 and the second shield line 462 through the contact hole formed in the touch insulating layer 151, the shield part 460 can perfectly block noise that can enter between the first shield line 461, the second shield line 462, and the third shield line 463.

In addition, because the shield part 460 is disposed to surround the plurality of touch routing lines 154a including the first touch routing line 154a-1, the first touch routing line 154a-1 most vulnerable to noise can be protected from noise, and the other plurality of touch routing lines 154a adjacent to the first touch routing line 154a-1 can also be protected from noise.

When noise such as the driving signal does not enter the plurality of touch routing lines 154a including the first touch routing line 154a-1, a signal-to-noise ratio of the touch signal increases, and interference between the signals does not occur, such that the touch sensing accuracy can be improved. For example, because the shield part 460 is disposed to surround the plurality of touch routing lines 154a including the first touch routing line 154a-1, it is possible to further suppress a touch noise defect and improve touch sensitivity, thereby providing the much more stable touch detection system.

Figure 10:
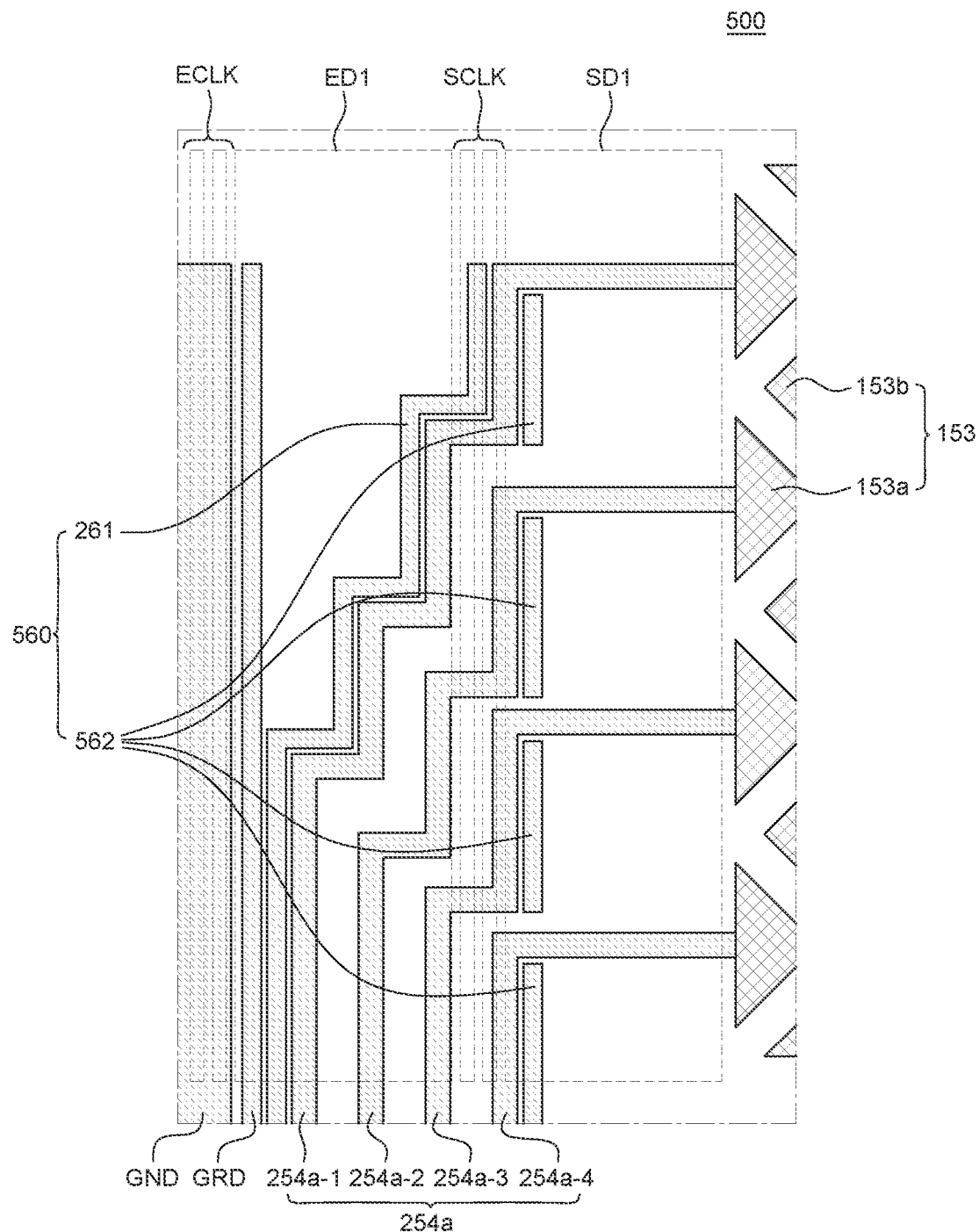
FIG. 10 is an enlarged top plan view of a display device according to still yet another embodiment of the present disclosure.

FIG. 10 is an enlarged top plan view of a display device according to still yet another embodiment of the present disclosure.

Referring to FIG. 10, a display device 500 according to still yet another embodiment of the present disclosure is substantially identical in configuration to the display device 200 illustrated in FIG. 6, except for, e.g., a shield part 560. Therefore, repeated descriptions of the identical components will be omitted or may be briefly discussed.

The shield part 560 can be disposed in the non-display area N/A and surround two opposite sides and a lower side of the plurality of touch routing lines 254a including the first touch routing line 254a-1. The shield part 560 can include the first shield line 261, a second shield line 562, and a third shield line that is not illustrated in FIG. 10. The first shield line 261 can be disposed between the guard line GRD and the first touch routing line 254a-1, i.e., disposed at one side of the first touch routing line 254a-1. The second shield line 562 can be disposed between the fourth touch routing line 254a-4 and the display area A/A, i.e., disposed at the other side of the fourth touch routing line 254a-4. However, the second shield line 562 is not limited as being disposed at the other side of the fourth touch routing line 254a-4.

The second shield line 562 can be disposed at the other side of the second touch routing line 254a-2 or the other side of the third touch routing line 254a-3. The third shield line can be disposed below the plurality of touch routing lines 254a and connect the first shield line 261 and the second shield line 562. For example, the shield part 560 is disposed to surround the two opposite sides and the lower side of the plurality of touch routing lines 254a instead of the single touch routing line. Therefore, the third shield line can extend long in order to connect the first shield line 261 and the second shield line 562. However, the third shield line is not limited as being disposed to overlap all the touch routing lines 254a.

The number of touch routing lines 254a, which overlap the third shield line, can be variously designed depending on the position at which the second shield line 562 is disposed. For example, the shield part 560 can be disposed to surround the two or more touch routing lines 254a disposed at the outermost periphery on the substrate 110 among the plurality of touch routing lines 254a and can also be disposed to surround all the plurality of touch routing lines 254a.

In this case, the first shield line 261 of the shield part 560 can have a stepped shape corresponding to the stepped shape of the first touch routing line 254a-1. For example, the first shield line 261 can include vertical portions parallel to the data line in the display area A/A so as to be parallel to two opposite sides of the first touch routing line 254a-1, and horizontal portions perpendicular to the data line in the display area A/A, and the vertical portions and the horizontal portions can be repeatedly disposed.

In the case in which the shield part 560 is disposed to surround only some of the plurality of touch routing lines 254a, the second shield line 562 can have a stepped shape corresponding to the stepped shape of the plurality of touch routing lines 254a, like the first shield line 261. However, as illustrated in FIG. 10, in the case in which the shield part 560 is disposed to surround all the plurality of touch routing lines 254a, the second shield line 562 can extend only in the direction parallel to the data line in the display area A/A, like the display device 400 illustrated in FIG. 9. However, the line shape of the shield part 560 is not limited thereto.

The shield part 560 can also be disposed to surround only some of the touch routing lines 254a farthest from the display area A/A among the plurality of touch routing lines 254a disposed at the outermost periphery.

Therefore, in the display device 500 according to still yet another embodiment of the present disclosure, the touch precision can be improved because the shield part 560 is disposed to surround the two opposite sides and the lower side of the plurality of touch routing lines 254a including the first touch routing line 254a-1.

As described above, when some of the driving signals generated by the first light-emitting driver ED1 and the light-emitting clock line ECLK pass through the first electrode 131 and the second electrode 133 and enter the plurality of touch routing lines 254a, the driving signals can act as noise and cause a defect. In particular, among the plurality of touch routing lines 254a, the first touch routing line 254a-1 can be more vulnerable to a touch noise defect because the first touch routing line 254a-1 is positioned at the outermost periphery and disposed to be closest to the light-emitting clock line ECLK.

In this case, the driving signal generated by the light-emitting clock line ECLK and the like can be more perfectly blocked when the first shield line 261 is disposed at one side of the first touch routing line 254a-1, the second shield line 562 is disposed at the other side of the fourth touch routing line 254a-4, and the third shield line connected to the first shield line 261 and the second shield line 562 through the contact hole is disposed to surround the lower side of the plurality of touch routing lines 254a. In particular, because the third shield line is connected to the first shield line 261 and the second shield line 562 through the contact hole formed in the touch insulating layer 151, the shield part 560 can perfectly block noise that can enter between the first shield line 261, the second shield line 562, and the third shield line.

In addition, because the shield part 560 is disposed to surround the plurality of touch routing lines 254a including the first touch routing line 254a-1, the first touch routing line 254a-1 most vulnerable to noise can be protected from noise, and the other plurality of touch routing lines 254a adjacent to the first touch routing line 254a-1 can also be protected from noise.

Further, even though the vertical portions and the horizontal portions of the plurality of touch routing lines 254a are repeatedly disposed in a stepped shape, it is possible to perfectly block noise because the first shield line 261 and the second shield line 562 can each have the stepped shape corresponding to the stepped shape of the plurality of touch routing lines 254a.

When noise such as the driving signal does not enter the plurality of touch routing lines 254a including the first touch routing line 254a-1, a signal-to-noise ratio of the touch signal increases, and interference between the signals does not occur, such that the touch sensing accuracy can be improved. For example, because the shield part 560 is disposed to surround the plurality of touch routing lines 254a including the first touch routing line 254a-1 without limitation in line shape of the plurality of touch routing lines 254a, it is possible to further suppress a touch noise defect and improve touch sensitivity, thereby providing the much more stable touch detection system.

The exemplary embodiments of the present disclosure can also be described as follows:

According to an aspect of the present disclosure, there is provided a display device. The display device includes a substrate including a display area and a non-display area. The display device further includes a plurality of light-emitting elements disposed on the substrate. The display device further includes a sealing layer disposed on the plurality of light-emitting elements. The display device further includes a touch detection part disposed on the sealing layer in the display area. The display device further includes a plurality of touch routing lines connected to the touch detection part in the non-display area. The display device further includes a shield part disposed to surround two opposite sides and a lower side of one or more touch routing lines among the plurality of touch routing lines.

The shield part can include a first shield line disposed at one side of the one or more touch routing lines, a second shield line disposed at the other side of the one or more touch routing lines, and a third shield line disposed below the one or more touch routing lines and configured to connect the first shield line and the second shield line.

The touch detection part can include a plurality of touch electrodes including a plurality of touch sensors, a connection electrode disposed below the plurality of touch electrodes and configured to connect the plurality of touch sensors, and a touch insulating layer disposed between the touch electrode and the connection electrode. The first shield line and the second shield line can be disposed on the same layer as the plurality of touch electrodes, and the third shield line can be disposed on the same layer as the connection electrode.

The display device can further include a ground line disposed at an outermost periphery of the non-display area and disposed on the same layer as the plurality of touch electrodes, and a guard line disposed between the ground line and the plurality of touch routing lines. The first shield line can be disposed between the one or more touch routing lines and the guard line.

The one or more touch routing line, among the plurality of touch routing lines, can be one touch routing line disposed at an outermost periphery on the substrate.

The shield part can be disposed to surround only of a portion of the touch routing line farthest from the display area among the one or more touch routing lines disposed at the outermost periphery.

The one or more touch routing lines can each have a stepped shape in a plan view, and the first shield line and the second shield line can each have a stepped shape corresponding to the stepped shape of each of the one or more touch routing lines.

The one or more touch routing lines can be two or more touch routing lines disposed at an outermost periphery on the substrate among the plurality of touch routing lines.

The third shield line can be disposed below all of the touch routing lines.

The plurality of touch routing lines can be RX touch routing lines.

The display device can further include a scan driver disposed in the non-display area, a plurality of scan clock lines disposed closer to an outer periphery than the scan driver, a light-emitting driver disposed closer to the outer periphery than the plurality of scan clock lines, and a light-emitting clock line disposed closer to the outer periphery than the light-emitting driver. The plurality of light-emitting element can include a cathode. The cathode can be disposed on at least a part of the scan driver, the plurality of scan clock lines, and the light-emitting driver in the non-display area.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto.

Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
    a substrate including a display area and a non-display area;
    a plurality of light-emitting elements disposed on the substrate;
    a sealing layer disposed on the plurality of light-emitting elements;
    a touch detection part disposed on the sealing layer in the display area;
    a plurality of touch routing lines connected to the touch detection part in the non-display area; and
    a shield part disposed to surround two opposite sides and a lower side of one or more touch routing lines among the plurality of touch routing lines,
    wherein the shield part includes a first shield line disposed at one side of the one or more touch routing lines and a second shield line disposed at another side of the one or more touch routing lines,
    wherein the touch detection part includes a plurality of touch electrodes including a plurality of touch sensors,
    wherein the first shield line and the second shield line are disposed on a same layer as the plurality of touch electrodes, and
    wherein the shield part further includes:
    a third shield line disposed below the one or more touch routing lines, the third shield line electrically connecting the first shield line with the second shield line, and the first, second and third shield lines being electrical conductors.

2. The display device of claim 1, wherein the touch detection part further includes:
    a connection electrode disposed below the plurality of touch electrodes, and configured to connect the plurality of touch sensors; and
    a touch insulating layer disposed between the touch electrodes and the connection electrode,
    wherein the third shield line is disposed on a same layer as the connection electrode.

3. The display device of claim 2, further comprising:
    a ground line disposed at an outermost periphery of the non-display area and disposed on the same layer as the plurality of touch electrodes; and
    a guard line disposed between the ground line and the plurality of touch routing lines,
    wherein the first shield line is disposed between the one or more touch routing lines and the guard line.

4. The display device of claim 3, wherein the guard line is disposed on the same layer as the plurality of touch electrodes in the non-display area.

5. The display device of claim 2, wherein the third shield line is connected to the first shield line and the second shield line through a contact hole formed in the touch insulating layer.

6. The display device of claim 2, wherein the plurality of touch lines include:
    a first touch routing line connected to a touch electrode positioned at an uppermost side in a plan view;
    a second touch routing line connected to a touch electrode positioned in a next row;
    a third touch routing line connected to a touch electrode positioned in a next row; and
    a fourth touch routing line connected to a touch electrode positioned at a lowermost side in the plan view.

7. The display device of claim 6, wherein the first shield line is disposed at one side of the first touch routing line,
    the second shield line is disposed at another side of the first touch routing line, and
    the third shield line is disposed to surround a lower side of the first touch routing line.

8. The display device of claim 6, wherein the first shield line is disposed at one side of a partial region disposed at the outermost periphery of the first touch routing line,
    the second shield line is disposed at another side of a partial region disposed at the outermost periphery of the first touch routing line, and
    the third shield line is disposed to surround a lower side of the first touch routing line.

9. The display device of claim 6, wherein the first shield line is disposed at one side of the first touch routing line,
    the second shield line is disposed at another side of the fourth touch routing line, and
    the third shield line is disposed to surround a lower side of the plurality of touch routing lines.

10. The display device of claim 1, wherein the one or more touch routing lines, among the plurality of touch routing lines, are one or more touch routing lines disposed at an outermost periphery on the substrate.

11. The display device of claim 10, wherein the shield part is disposed to surround only a portion of the touch routing line farthest from the display area among the one or more touch routing lines disposed at the outermost periphery.

12. The display device of claim 1, wherein each of the one or more touch routing lines has a stepped shape in a plan view, and
    each of the first shield line and the second shield line has a stepped shape corresponding to the stepped shape of each of the one or more touch routing lines.

13. The display device of claim 1, wherein the one or more touch routing lines are two or more touch routing lines disposed at an outermost periphery on the substrate among the plurality of touch routing lines.

14. The display device of claim 1, wherein the third shield line is disposed below all of the touch routing lines.

15. The display device of claim 1, wherein the plurality of touch routing lines are receiving touch routing lines.

16. The display device of claim 1, further comprising:
    a scan driver disposed in the non-display area;
    a plurality of scan clock lines disposed closer to an outer periphery than the scan driver;
    a light-emitting driver disposed closer to the outer periphery than the plurality of scan clock lines; and
    a light-emitting clock line disposed closer to the outer periphery than the light-emitting driver, wherein the plurality of light-emitting element include a cathode, and wherein the cathode is disposed on at least a part of the scan driver, the plurality of scan clock lines, and the light-emitting driver in the non-display area.

17. The display device of claim 16, wherein the plurality of touch routing lines are disposed to overlap partial regions of the scan driver, the light-emitting driver, the scan clock lines, and the light-emitting clock line in the non-display area.

18. A display device comprising:
a substrate including a display area and a non-display area;
a plurality of light-emitting elements disposed on the substrate;
a sealing layer disposed on the plurality of light-emitting elements;
a touch detection part disposed on the sealing layer in the display area;
a plurality of touch routing lines connected to the touch detection part in the non-display area; and
a shield part disposed to surround two opposite sides and a lower side of one or more touch routing lines among the plurality of touch routing lines,
wherein the shield part includes a first shield line disposed at one side of the one or more touch routing lines and a second shield line disposed at another side of the one or more touch routing lines,
wherein the touch detection part includes a plurality of touch electrodes including a plurality of touch sensors,
wherein the first shield line and the second shield line are disposed on a same layer as the plurality of touch electrodes,
wherein the shield part further includes:
a third shield line disposed below the one or more touch routing lines, and configured to connect the first shield line and the second shield line,
wherein the touch detection part further includes:
a connection electrode disposed below the plurality of touch electrodes, and configured to connect the plurality of touch sensors; and
a touch insulating layer disposed between the touch electrodes and the connection electrode, and
wherein the third shield line is disposed on a same layer as the connection electrode.

* * * * *